US009739637B2

(12) United States Patent
Feucht et al.

(10) Patent No.: US 9,739,637 B2
(45) Date of Patent: Aug. 22, 2017

(54) MAGNETIC FIELD MOTION SENSOR AND RELATED TECHNIQUES

(71) Applicant: Allegro Microsystems, LLC, Worcester, MA (US)

(72) Inventors: Christian Feucht, Annecy (FR); Andreas P. Friedrich, Metz-Tessy (FR); Andrea Foletto, Annecy (FR)

(73) Assignee: Allegro MicroSystems, LLC, Worcester, MA (US)

( * ) Notice: Subject to any disclaimer, the term of this patent is extended or adjusted under 35 U.S.C. 154(b) by 146 days.

(21) Appl. No.: 14/529,480

(22) Filed: Oct. 31, 2014

(65) Prior Publication Data

US 2016/0123770 A1 May 5, 2016

(51) Int. Cl.
*G01D 5/14* (2006.01)

(52) U.S. Cl.
CPC .................................. *G01D 5/145* (2013.01)

(58) Field of Classification Search
CPC ...... G01R 33/09; G01R 15/20; G01R 15/202; G01R 21/08; G01R 33/06; G01R 33/07; G01R 33/077; G11B 2005/0016; G11B 2005/3996; G01D 5/142
USPC ........................................................ 324/207
See application file for complete search history.

(56) References Cited

U.S. PATENT DOCUMENTS

| 5,917,320 | A | 6/1999 | Scheller et al. |
| 6,091,239 | A | 7/2000 | Vig et al. |
| 6,815,944 | B2 | 11/2004 | Vig et al. |
| 7,184,876 | B2 | 2/2007 | Teulings et al. |
| 7,253,614 | B2 | 8/2007 | Forrest et al. |
| 7,365,530 | B2 | 4/2008 | Bailey et al. |
| 8,624,588 | B2 | 1/2014 | Vig et al. |
| 8,729,890 | B2 | 5/2014 | Donovan et al. |
| 8,793,085 | B2 | 7/2014 | Donovan et al. |
| 2011/0298447 | A1* | 12/2011 | Foletto .................. G01D 5/145 324/207.2 |
| 2012/0223699 | A1* | 9/2012 | Holman, Jr. ......... G01D 5/2451 324/207.2 |
| 2013/0099708 | A1* | 4/2013 | Shimizu ............... H02P 21/146 318/400.39 |

(Continued)

*Primary Examiner* — Son Le
*Assistant Examiner* — Akm Zakaria
(74) *Attorney, Agent, or Firm* — Daly, Crowley, Mofford & Durkee, LLP

(57) ABSTRACT

A magnetic field sensor for detecting motion of an object includes magnetic field sensing elements to generate at least two phase-separated magnetic field signals and a processor including a vector angle generator to generate vector angle values as a function of the magnetic field signals and a vector angle comparator to generate a comparator output signal indicative of a difference between a plurality of vector angle values. An output signal generator responsive to the comparator output signal is configured to generate a sensor output signal indicative of a one or more conditions of motion of the object including: an absence of normal rotation, a direction change, and a vibration. In some embodiments, the vector angle comparator may generate a comparator output signal indicative of a comparison of a vector angle value and one or more threshold values. In this case, the output signal generator may be configured to generate a sensor output signal indicative of a speed of motion and/or a position of the object.

31 Claims, 15 Drawing Sheets

(56) References Cited

U.S. PATENT DOCUMENTS

2013/0238278 A1\* 9/2013 Shoemaker .......... G01R 33/075
                                                702/145
2014/0176125 A1   6/2014 Friedrich et al.
2014/0347040 A1\* 11/2014 Kawase ............... G01D 5/2448
                                                324/207.12

\* cited by examiner

MAGNETIC FIELD MOTION SENSOR AND RELATED TECHNIQUES

CROSS REFERENCE TO RELATED APPLICATIONS

Not Applicable.

STATEMENT REGARDING FEDERALLY SPONSORED RESEARCH

Not Applicable.

FIELD

This invention relates generally to magnetic field sensors and, more particularly, to magnetic field sensors for detecting speed, position, direction, and/or vibration of an object.

BACKGROUND OF THE INVENTION

Magnetic field sensors for detecting movement of a ferromagnetic object are known. The magnetic field associated with the object is detected by one or more magnetic field-to-voltage transducers (referred to herein as a magnetic field sensing elements), such as Hall effect elements or magnetoresistance elements, which provide one or more signals (i.e., magnetic field signals) dependent on a magnetic field associated with the object.

Some magnetic field sensors merely provide an output signal representative of the proximity of the object and maybe referred to as proximity detectors. However, other sensors, e.g., rotation detectors, provide an output signal representative of the approach and retreat of features of a rotating object, such as each tooth of a rotating gear or each segment of a ring magnet having segments with alternating polarities. The rotation detector processes the magnetic field signal to generate an output signal that changes state each time the magnetic field signal either reaches a peak (positive or negative peak) or crosses a threshold level. Therefore, the output signal, which has an edge rate or period, is indicative of a speed of rotation of the gear or of the ring magnet.

The magnetic field signal is dependent on the distance between the object, for example the rotating ferromagnetic gear, and the magnetic field sensing element(s), for example, the Hall elements. This distance is referred to herein as an "air gap." As the air gap increases, the magnetic field sensing element tends to experience a smaller magnetic field from the rotating ferromagnetic gear, and therefore smaller changes in the magnetic field generated by passing teeth of the rotating ferromagnetic gear.

In one type of rotation detector, sometimes referred to as a peak-to-peak percentage detector (or threshold detector), a threshold level is equal to a percentage of the peak-to-peak magnetic field signal. For this type of sensor, the output signal changes state when the magnetic field signal crosses the threshold level. One such peak-to-peak percentage detector is described in U.S. Pat. No. 5,917,320 entitled "Detection of Passing Magnetic Articles While Periodically Adapting Detection Threshold," which is assigned to the assignee of the present invention and incorporated herein by reference in its entirety.

In another type of rotation detector, sometimes referred to as a slope-activated detector or as a peak-referenced detector, threshold levels differ from the positive and negative peaks (i.e., the peaks and valleys) of the magnetic field signal by a predetermined amount. Thus, in this type of sensor, the output signal changes state when the magnetic field signal departs from a peak and/or valley by the predetermined amount. One such slope-activated detector is described in U.S. Pat. No. 6,091,239 entitled "Detection of Passing Magnetic Articles with a Peak Referenced Threshold Detector," which is assigned to the assignee of the present invention and incorporated herein by reference in its entirety.

It should be understood that, because the above-described peak-to-peak percentage detector and the above-described peak-referenced detector both have circuitry that can identify the positive and negative peaks of a magnetic field signal, the peak-to-peak percentage detector and the peak-referenced detector both include a peak detector circuit adapted to detect a positive peak and a negative peak of the magnetic field signal. Each, however, uses the detected peaks in different ways.

In order to accurately detect the positive and negative peaks of a magnetic field signal, some magnetic field sensors, are capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

Some rotation detectors detect a direction of rotation of the object. In one example, two or more magnetic field sensing elements are positioned in proximity to the object, adjacent to each other. The phases of the resulting output signals are separated by a phase difference associated with the spacing between the elements and the phase relationship of the output signals (i.e., the sequence of rising and falling edges) can be used to determine the direction of rotation.

Some rotation detectors are configured to identify a vibration of the rotating object, which vibration can generate signals from a magnetic field sensing element that might appear similar to signals that would be generated during a rotation of the gear or ring magnet in normal operation. Sensors having vibration processors that can detect a vibration are described in U.S. Pat. No. 7,365,530, entitled "Methods and Apparatus for Vibration Detection," and in U.S. Pat. No. 7,253,614, entitled "Proximity Detector Having a Sequential Flow State Machine," both of which are assigned to the assignee of the present invention and incorporated herein by reference in their entireties.

For a ferromagnetic gear capable of rotation about an axis of rotation in normal operation, the vibration can have at least two vibration components. A first vibration component corresponds to a "rotational vibration," for which the ferromagnetic gear vibrates back and forth about its axis of rotation. A second vibration component corresponds to "translational vibration," for which the above-described air gap dimension vibrates. Rotational vibration and the translational vibration can occur even when the ferromagnetic gear is not otherwise rotating in normal operation. Both the first and the second vibration components, separately or in combination, can generate an output signal from the rotation detector that indicates rotation of the ferromagnetic gear even when the ferromagnetic gear is not rotating in normal operation.

SUMMARY

A magnetic field sensor for detecting motion of an object includes a plurality of magnetic field sensing elements configured to generate at least two magnetic field signals each having an amplitude dependent on a magnetic field associated with the object and a respective phase and a processor configured to process the magnetic field signals and including vector angle generator to generate vector angle values as a function of the magnetic field signals and a vector angle comparator responsive to the vector angle values to generate a comparator output signal indicative of a difference between a plurality of vector angle values. An output signal generator coupled to the vector angle comparator is configured to generate a sensor output signal in response to the comparator output signal, wherein the sensor output signal is indicative of one or more conditions of: an absence of normal rotation of the object, a direction change of the motion of the object, and a vibration of the object.

Features may include one or more of the following. The sensor output signal indicates the condition when the comparator output signal indicates a difference between the plurality of vector angle values of less than a predetermined amount. The predetermined amount may be a multiple of approximately 180°. The vector angle comparator may be further responsive to at least one of the magnetic field signals and the compared vector angle values may coincide with predetermined points on the at least one magnetic field signal. The predetermined points on the at least one magnetic field signal may correspond to one or more of: zero crossings of the signal, crossings of the signal with a threshold, or crossings of the magnetic field signals with each other.

The vector angle values generated by the vector angle generator comprise an approximation of the arctangent of the two magnetic field signals, as may be generated using an arctangent lookup table and/or by using an arctangent approximation formula. The phases of the magnetic field signals may be separated by approximately 90°. A verification processor may be responsive to the magnetic field signals to determine if the magnetic field signals are useable to generate an accurate sensor output signal. The magnetic field sensor may include a normalization module coupled between the magnetic field sensing elements and the processor to normalize the amplitudes of the magnetic field signals and an offset reduction module coupled between the magnetic field sensing elements and the processor to reduce an offset of at least one of the magnetic field signals.

The magnetic field signals may comprise a difference between output signals of the plurality of magnetic field sensing elements. For example, the magnetic field sensor may include at least three magnetic field sensing elements, each providing a respective output signal, and may further include a combining circuit coupled to the at least three magnetic field sensing elements and configured to generate the magnetic field signals as a difference between the output signals of at least two of the magnetic field sensing elements, a sum of the output signals of at least two magnetic field sensing elements, or both.

The target object may be comprised of a magnetic material that generates a magnetic field. Alternatively, the object may be comprised of a ferromagnetic material and the magnetic field may be affected by movement of the object. The sensor may include a magnet to generate the magnetic field. The magnetic field sensing elements may be Hall effect elements and/or magnetoresistance elements.

According to another aspect, a method for detecting motion of an object includes generating at least two magnetic field signals, each having an amplitude dependent on a magnetic field associated with the object and a respective phase, generating vector angle values as a function of the magnetic field signals, comparing a plurality of the vector angle values to generate a comparator output signal indicative of a difference between the plurality of vector angle values, and generating, in response to the comparator output signal, an output signal indicative of one or more conditions of: an absence of normal rotation of the object, a direction change of the motion of the object, and a vibration of the object.

Generating the sensor output signal may include generating the output signal to indicate the presence of the condition when the comparator output signal indicates a difference between the plurality of vector angle values of less than a predetermined amount and the predetermined amount may be a multiple of approximately 180°. The compared vector angle values may coincident with predetermined points on at least one of the magnetic field signals such as: zero crossings of the at least one magnetic field signal, crossings of the at least one magnetic field signal with a threshold signal, or crossings of the magnetic field signals with each other. Generating the vector angle values may include accessing an arctangent lookup table as a function of a ratio of the amplitudes of the magnetic field signals or computation of an arctangent approximation formula.

Generating the magnetic field signals may include providing the magnetic field signals with a nominal difference between their respective phases of approximately 90°. The method may further include verifying whether the magnetic field signals are useable to generate an accurate output signal, normalizing the amplitude of the magnetic field signals, and reducing an offset of at least one of the magnetic field signals. Generating the magnetic field signals may include providing the magnetic field signals as a difference between output signals of at least two magnetic field sensing elements, a sum of output signals of at least two magnetic field sensing elements, or both.

According to yet another aspect, a magnetic field sensor for detecting motion of an object includes a plurality of magnetic field sensing elements configured to generate at least two magnetic field signals each having an amplitude dependent on a magnetic field associated with the object and a respective phase and a processor configured to process the magnetic field signals and including vector angle generator to generate a vector angle value as a function of the magnetic field signals and a vector angle comparator responsive to the vector angle value and to a threshold value to generate a comparator output signal indicative of a comparison of the vector angle value to the threshold value. An output signal generator coupled to the vector angle comparator is configured to generate a sensor output signal in response to the comparator output signal, wherein the sensor output signal is indicative of a speed of motion of the object.

In an embodiment, the vector angle comparator is responsive to a plurality of threshold values and the output signal generator is configured to generate the sensor output signal based a comparison of the vector angle value to the plurality of threshold values, wherein the sensor output signal is indicative of a position of the object.

With the described circuitry and techniques, speed, position, direction and/or vibration of a target can be detected with a desired resolution, higher than with conventional circuitry and techniques, and in a manner that is relatively immune to tolerances and magnetic field signal distortions. Furthermore, aspects of the motion detection can be programmed into the sensor or otherwise selected. As examples, the resolution of the position detection can be increased by increasing the number of threshold values to which the vector angle value is compared and the detections necessary to result in an indication of a vibration can be selected by varying the predetermined amount by which compared vector angle values must vary.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
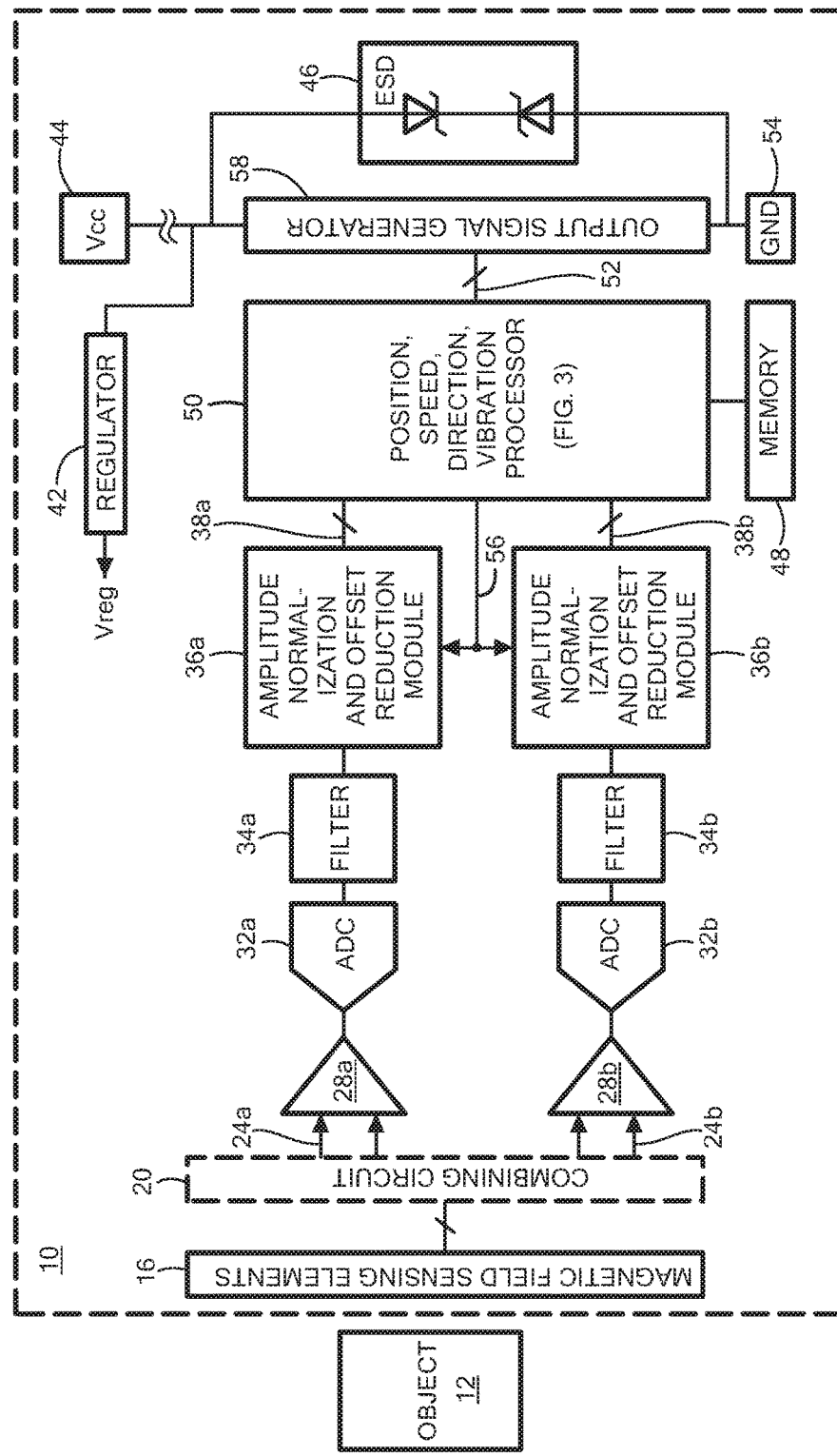
FIG. 1 is a block diagram of a sensor containing a processor to detect one or more of object speed, position, direction, or vibration.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch or proximity detector that senses the proximity of an object, a rotation detector that senses passing features of a rotating object (e.g., magnetic domains of a ring magnet or a ferromagnetic target such as gear teeth) where the magnetic field sensor may be used in combination with a back-biased or other magnet, and a magnetic field sensor that senses a magnetic field density of a magnetic field.

Embodiments are described for detecting movement of an object, which object functionality and type vary depending on a particular application. In some embodiments, the object is a gear (or a ring magnet), as may be used upon an engine camshaft target object. However, similar circuits and techniques can be used with other cams or gears or ring magnets disposed upon the engine camshaft, or upon other rotating parts of an engine (e.g., crank shaft, transmission gear, anti-lock braking system (ABS)), or upon rotating parts of a device that is not an engine. Other applications may include linear translation sensors or other sensors where the object does not rotate, but rather moves in along an axis.

The target object (i.e., gear or ring magnet) is not a part of the magnetic field sensors described below. Also, while examples are shown of magnetic field sensors that can sense gear teeth or gear teeth edges upon a gear configured to rotate, the magnetic field sensors can be used in other applications. The other applications include, but are not limited to, sensing ferromagnetic objects upon a structure configured to move linearly.

As used herein, the term "processor" is used to describe an electronic circuit that performs a function, an operation, or a sequence of operations, as may be in the manner of a state machine. The function, operation, or sequence of operations can be hard coded into the electronic circuit or soft coded by way of instructions held in a memory device.

A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

It should be understood that electronic functions that may be described below to be analog functions can instead be implemented in digital circuits or in processors and conversely, electronic functions that may be described below to be a digital function can instead be implemented in analog circuits. For example, it will be recognized that a comparator can be implemented as an analog comparator that compares analog voltages, as a digital comparator that compares digital values, or as a processor that compares digital values.

As used herein, the term "predetermined," when referring to a value or signal or event, is used to refer to a value or signal or event that is known. More particularly, the value, signal or event may be known and/or the type of value, signal or event may be known. For example, a predetermined value may be set, or fixed, in the factory at the time of manufacture, or by external means, e.g., programming, thereafter. A predetermined event may be a particular selected event type. For example, a predetermined event can be zero crossings of a signal or threshold crossings of a signal, for example. As used herein, the term "determined," when referring to a value or signal, is used to refer to a value or signal that is identified by a circuit during operation, after manufacture.

Figure 2:
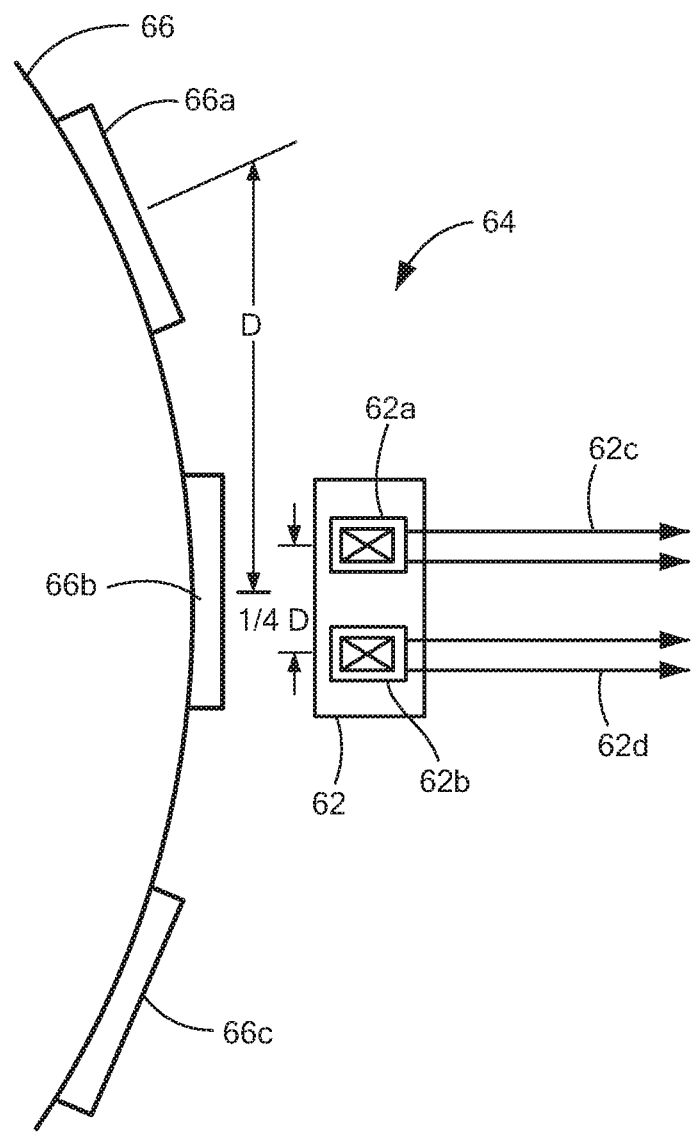
FIG. 2 is a representation of a portion of the sensor of FIG. 1 in an embodiment containing two magnetic field sensing elements to generate two magnetic field signals with a predetermined phase separation.

Referring to FIG. 1, a magnetic field sensor 10 is positioned in proximity to an object, or target, 12 to detect one or more characteristics of relative motion of the object including a position of the object, a speed of motion of the object, a direction of motion of the object, and/or a vibration of the object. The object may itself move or the object may be stationary and the sensor 10 may move. Various types of motion are possible. For example, the object may experience translational movement along an axis, or the object may rotate, such as illustrated in FIGS. 2-2D.

The magnetic field sensor 10 includes a plurality of magnetic field sensing elements 16 configured to generate at least two magnetic field signals 24a, 24b, each having an amplitude dependent on a magnetic field associated with the object 12 and a respective phase. The magnetic field signals 24a, 24b may be differential signals as shown or alternatively, may be single-ended signals.

The target 12 may be a ferromagnetic object. The ferromagnetic object can be a magnetic object and the magnetic field detected by the magnetic field sensing elements 16 may be generated by the object itself and may be subject to direction and amplitude changes depending on positions of the object 10 relative to the sensor 10. Alternatively, a separate source of a magnetic field may be provided (e.g., a permanent magnet or hard ferromagnetic material) as part of, or adjacent to the magnetic field sensor 10 and the magnetic field detected by the magnetic field sensing elements 16 may be altered by movement of the ferromagnetic object.

The phases of the magnetic field signals 24a, 24b are separated, or offset from each other, by a predetermined phase difference, as may be accomplished in various ways. In some embodiments, the magnetic field sensor 10 includes a combining circuit 20 coupled to the magnetic field sensing elements 16 to generate the signals 24a, 24b with a known, or predetermined phase separation.

Referring also to FIG. 2, an illustrative configuration 60 of an object 66 and magnetic field sensing elements 62 capable of generating phase-separated magnetic field signals 62c, 62d (which may the same as or similar to magnetic field signals 24a, 24b of FIG. 1) is shown. The illustrative object 66 is a rotatable gear having ferromagnetic gear teeth, e.g., gear teeth 66a, 66b, 66c. A nominal distance (center-to-center) between adjacent teeth 66a, 66b and 66b, 66c is labeled "D". The magnetic field sensing elements 62 are shown to include two elements 62a, 62b, as may be Hall effect elements in one example, supported by a substrate with a nominal distance between the elements of one-quarter of the nominal distance (center-to-center) of adjacent gear teeth 66a, 66b. This configuration 60 yields output signals 64a, 64b from respective magnetic field sensing elements 62a, 62b that have phases separated by approximately 90°. It will be appreciated that other phase separations between output signals 62c, 62d are possible by varying the spacing between the elements 62a, 62b with respect to the spacing between adjacent teeth 66a-66c.

Figure 2A:
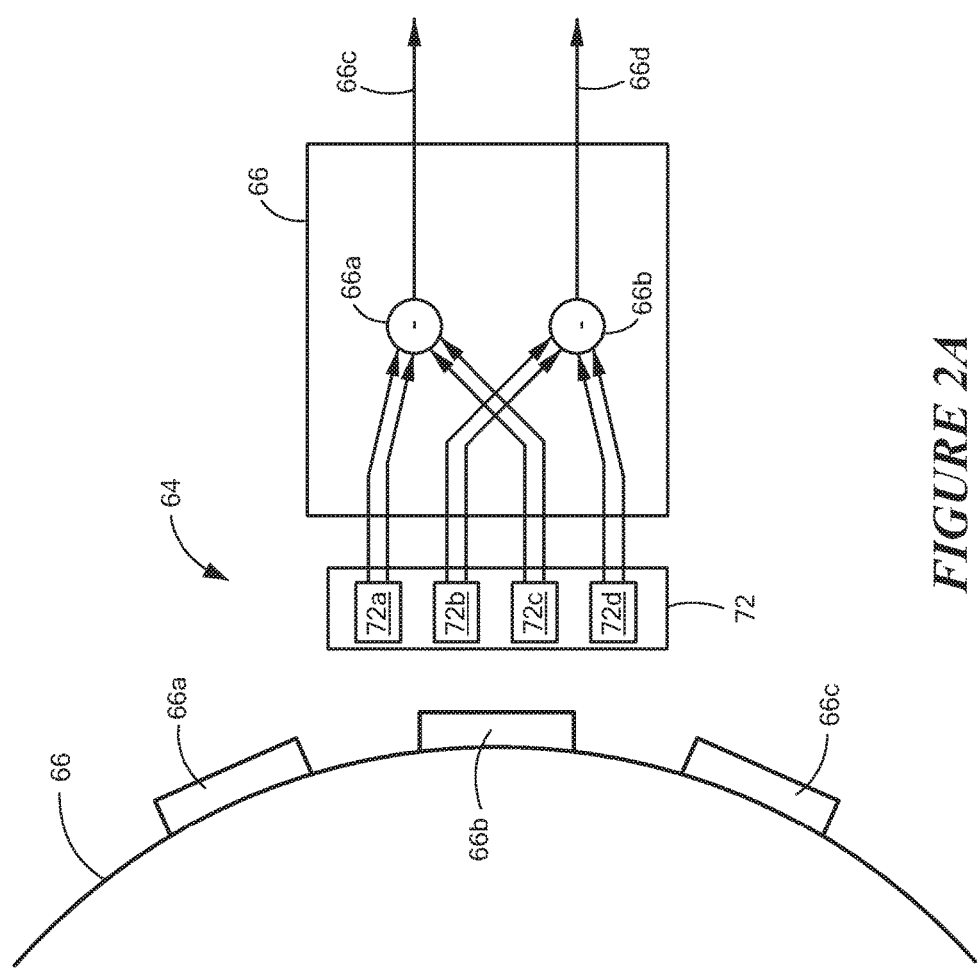
FIG. 2A is a representation of a portion of the sensor of FIG. 1 in an embodiment containing four magnetic field sensing elements to generate two magnetic field signals with a predetermined phase separation.

Referring to FIG. 2A, another configuration 64 of object 66 and magnetic field sensing elements 72 provides phase-separated magnetic field signals 66c, 66d (which may the same as or similar to magnetic field signals 24a, 24b of FIG. 1). A combining circuit 66 coupled to the magnetic field sensing elements 72 is configured to generate the magnetic field signals 66c, 66d as a difference between the output signals of at least two of the magnetic field sensing elements. In the illustrated configuration, the combining circuit 66 includes difference elements 76a, 76b coupled as shown so that the magnetic field signal 66c can be represented as (72a-72c) and the magnetic field signal 66d can be represented as (72b-72d), where 72a, 72b, 72c, and 72d represent the output signals of the respective magnetic field sensing elements 72a-72d in this context. In one example of the configuration 64 of FIG. 2A, the magnetic field sensing elements 72a-72d are GMR elements. This configuration 64 yields magnetic field signals 66c, 66d that have phases separated by approximately 90°.

Figure 2B:
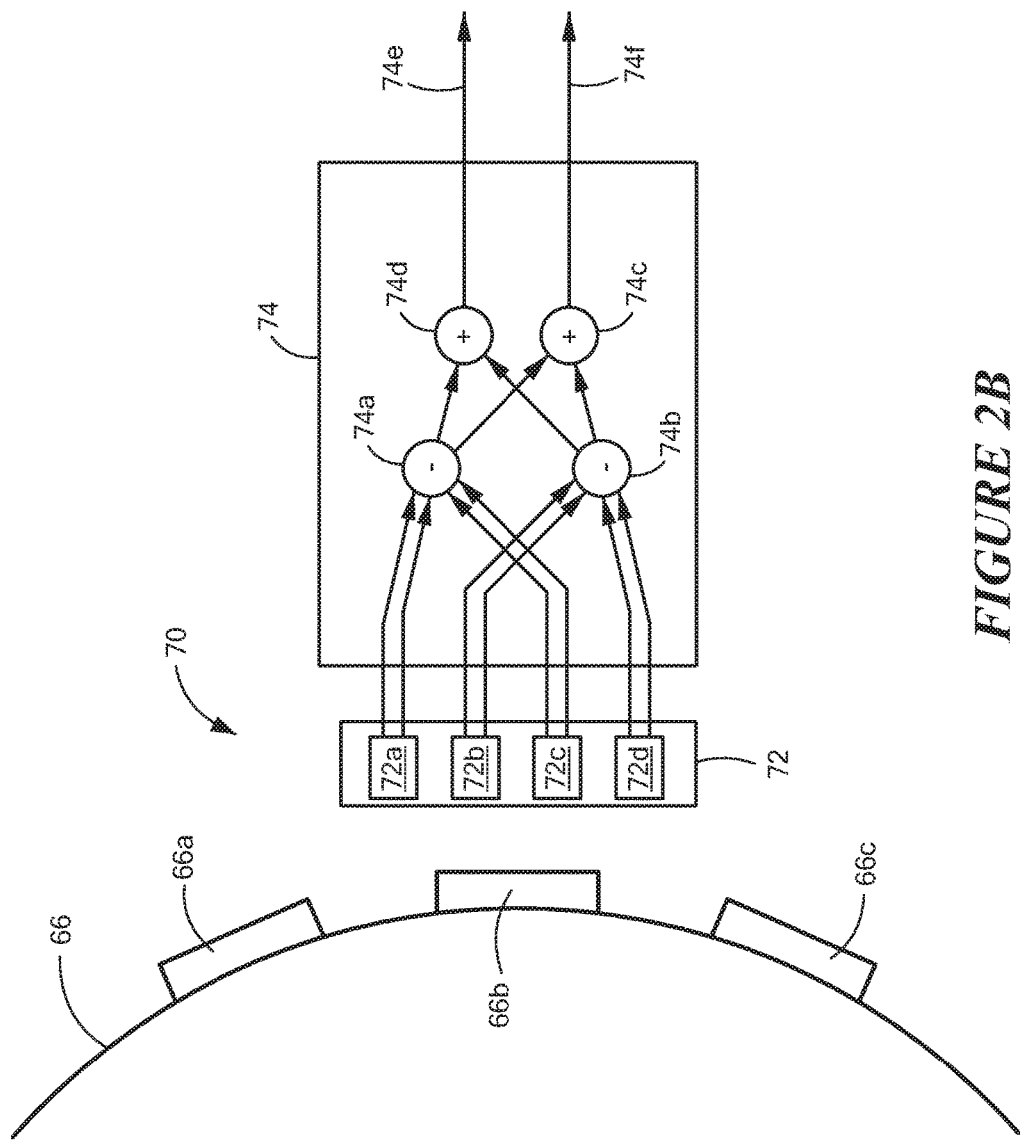
FIG. 2B is a representation of a portion of the sensor of FIG. 1 in an alternative embodiment containing four magnetic field sensing elements to generate two magnetic field signals with a predetermined phase separation.

Referring to FIG. 2B, another configuration 70 of object 66 and magnetic field sensing elements 72 provides phase-separated magnetic field signals 74e, 74f (which may the same as or similar to magnetic field signals 24a, 24b of FIG. 1). A combining circuit 74 coupled to the magnetic field sensing elements 72 is configured to generate the magnetic field signals 74e, 74f as a difference between the output signals of at least two of the magnetic field sensing elements, a sum of the output signals of at least two magnetic field sensing elements, or both. In the illustrated configuration, the combining circuit 74 includes difference elements 74a, 74b, and 74c, and a summation element 74d coupled as shown so that the magnetic field signal 74e can be represented as (72a-72c)+(72b-72d) and the magnetic field signal 74f can be represented as (72a-72c)−(72b-72d), where 72a, 72b, 72c, and 72d represent the output signals of the respective magnetic field sensing elements 72a-72d in this context. In one example of the configuration 70 of FIG. 2B, the magnetic field sensing elements 72a-72d are GMR elements. Further details of the configuration 70 are found in a co-pending U.S. Patent Application entitled "Magnetic Field Sensor for Sensing a Movement of a Ferromagnetic Target Object" filed on even date herewith and incorporated herein by reference in its entirety. This configuration 70 can yield magnetic field signals 74e, 74f that have phases separated by approximately 90°.

Figure 2C:
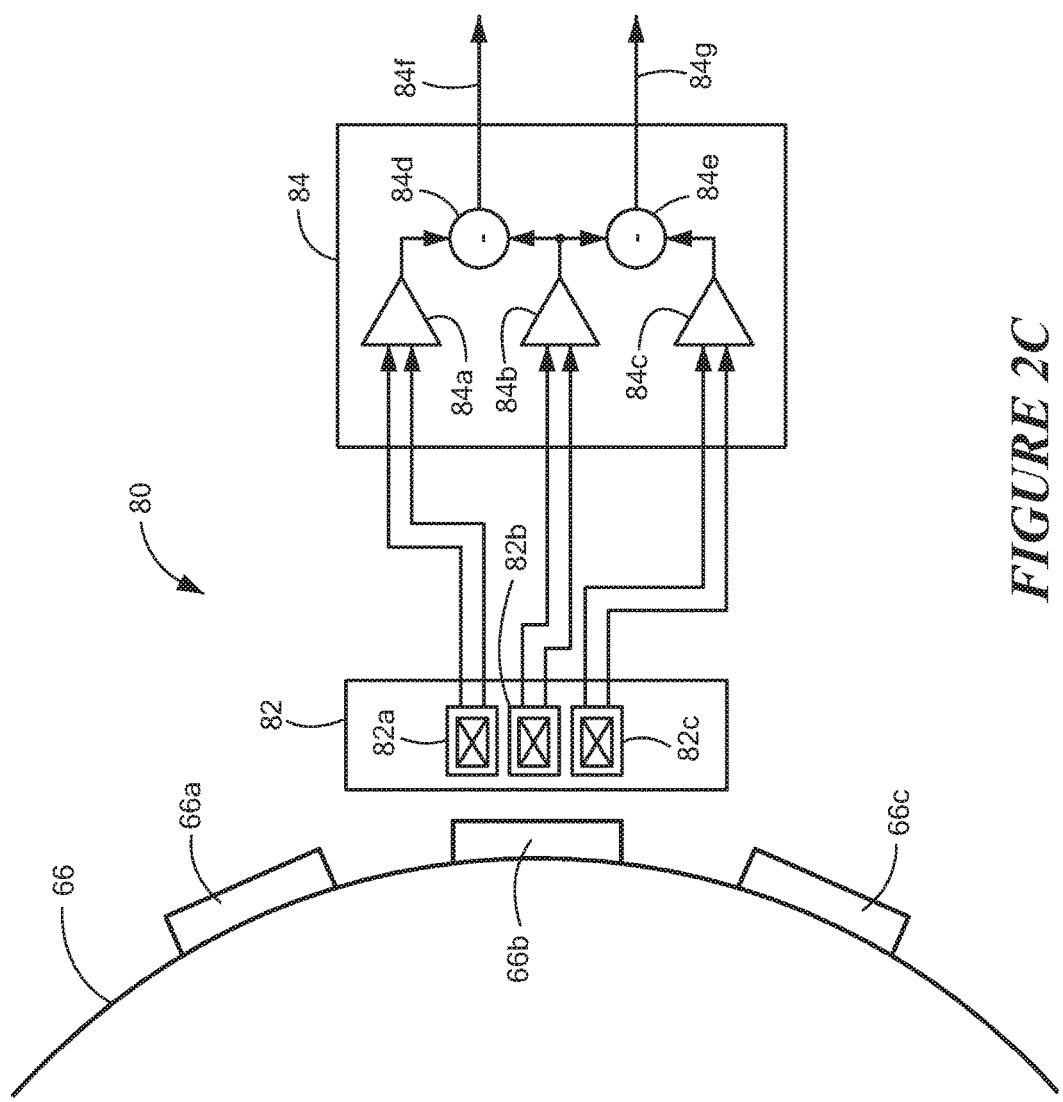
FIG. 2C is a representation of a portion of the sensor of FIG. 1 in an embodiment containing three magnetic field sensing elements to generate two magnetic field signals with a predetermined phase separation.
Figure 2D:
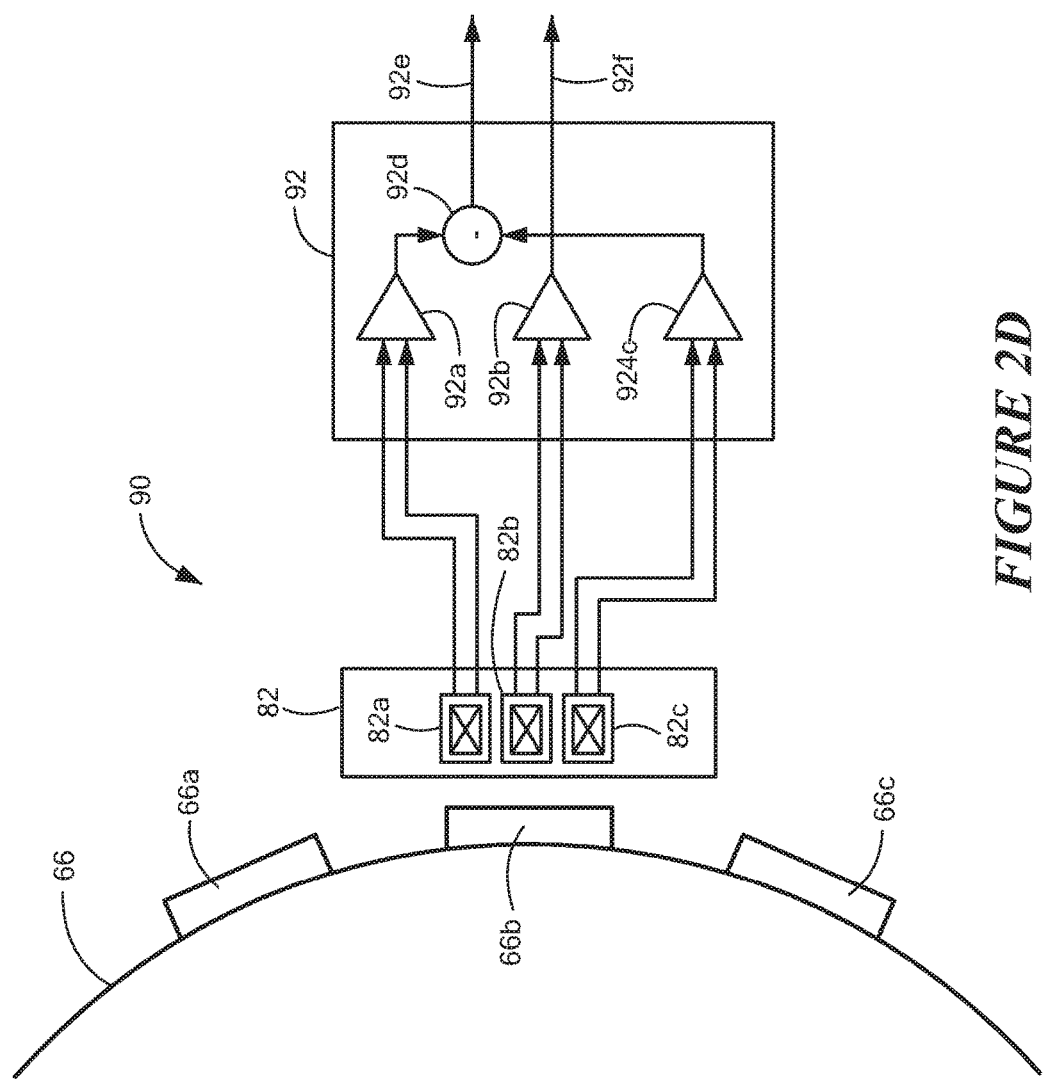
FIG. 2D is a representation of a portion of the sensor of FIG. 1 in an alternative embodiment containing three magnetic field sensing elements to generate two magnetic field signals with a predetermined phase separation.

Referring to FIG. 2C, another configuration 80 of object 66 and magnetic field sensing elements 82 includes combining circuit 84. The magnetic field sensing elements 82a-82c, such as Hall effect elements, are positioned such that the center element 82b is located midway between the outer magnetic field sensing elements 82a, 82c. The output signals of the magnetic field elements 82a-82c are coupled through respective amplifiers 84a, 84c to difference elements 84d and 84e. With the illustrated arrangement, difference element 84d generates a magnetic field signal 84f as a difference between the output signal of element 82a and the output signal of element 82b and difference element 84e generates a magnetic field signal 84g as a difference between the output signal of element 82b and the output signal of element 82c. This configuration 80 can yield magnetic field signals 84f, 84g that have phases separated by approximately 90°.

Another configuration 90 of object 66 and magnetic field sensing elements 82 shown in FIG. 2D includes combining circuit 92 containing amplifiers 92a-92c and a difference element 92d. The magnetic field sensing elements 82a-82, such as Hall effect elements, are coupled to respective amplifiers 94a-94c, as shown. The output signals of amplifiers 94a and 94c are coupled to the difference element 92d that provides a magnetic field signal 92e as the difference between the output signals of magnetic field sensing elements 82a and 82c; whereas the output signal of amplifier 92b provides the magnetic field signal 92f. With this particular configuration, the resulting magnetic field signals 92e and 92f can be provided with a nominal 90° phase difference. A configuration of this type is described in a U.S. Pat. No. 7,184,876 entitled "Device and Process for Determining the Position of an Engine."

It will be appreciated by those of ordinary skill in the art that the configurations 60-90 of FIGS. 2-2D, respectively, show examples of a variety of configurations that can be used to generate magnetic field signals having a predetermined phase difference for further processing.

Referring again to FIG. 1, the magnetic field signals 24a, 24b may be processed by various circuitry to generate left and right channel signals 38a, 38b, respectively, for coupling to a processor 50. The terms "left" and "right" are arbitrary identifiers which may indicate different physical locations of the magnetic field sensing elements that contribute to the left and right channel signals and/or different "channels" or paths of processing circuitry.

Magnetic field signals 24a, 24b may be amplified by respective amplifiers 28a, 28b and converted into digital signals by respective analog-to-digital converters 32a, 32b, as shown. The resulting digital signals may be filtered by filters 34a, 34b. Various types of digital filters 34a, 34b, are possible, such as FIR or IIR filters. In one embodiment, filters 34a, 34b are second order IIR filters.

The magnetic field sensor 10 includes amplitude normalization and offset reduction modules 36a, 36b, each configured to operate on a respective magnetic field signal to remove unwanted DC offsets in the processed signals and to normalize the signals to the same amplitude scale in order to enhance further processing by processor 50. The output signals 38a, 38b of the amplitude normalization and offset reduction modules 36a, 36b, having been processed by various left and right channel circuitry, may be referred to as left and right channel signals, respectively.

Various conventional techniques can be used to achieve the offset reduction and amplitude normalization functionality of modules 38a, 38b. As one example, one or more peak-to-peak detectors may detect the peak-to-peak amplitude of the magnetic field signals. The average of the peak-to-peak amplitude can establish the signal center for use in determining how much offset exists in the signals in order to thereby determine values for addition to, or subtraction from the signals to center the signals around zero, such as with the use of a high pass filter.

The detected peak-to-peak amplitude of the magnetic field signals can also be used to normalize the signals to a desired amplitude scale. For example, the magnetic field signals may be divided by the peak-to-peak signal amplitude.

Processor 50 is responsive to the left and right channel signals 38a, 38b to detect one or more characteristics of motion of target 12. In particular, the processor 50 can detect one or more of the speed, position, direction of motion and/or vibration of the object and generates one or more output signals 52 indicative of the detected characteristic. Details of the processor 50 are described below.

An output protocol processor 58 converts the processor output signal(s) 52 into a form dictated by the system in which the sensor 10 operates. As one example, the detected motion information may be provided to an engine control unit (ECU) of an automobile in the form of current pulses provided on the power and ground connections of the sensor (i.e., on VCC 44 and GND 54 connections). A sensor 10 of this type is sometimes referred to as a two-wire part. Alternatively however, one or more additional output signal connections can be provided by the sensor for communicating the detected motion information.

The format, or protocol, of the sensor output can also vary according to system requirements. As examples, the sensor output signal may take the form of a digital signal containing pulses occurring at a frequency indicative of the speed of rotation of the object and pulse widths indicative of the direction of rotation of the object. For example, a first pulse width (such as on the order of 45 μsec) can indicate a first direction of rotation, such as may be referred to as "forward" rotation and a second pulse width (such as on the order of 90 sec) can indicate a second direction of rotation, such as may be referred to as "reverse" rotation. Vibration information can be communicated in the form of a third pulse width for example or in some other form, such as by bringing the sensor output signal to one of its binary signal levels and holding the signal at that level, as will be described. It will be appreciated by those of ordinary skill in the art that the sensor output signal may include additional data words to form a data string, as may commence with a start data sequence (SDS) and include a data word separator between data words. The additional data words may convey diagnostic information, such as air gap and/or temperature information. Examples of sensor output protocols may be found in U.S. Pat. No. 6,815,944 entitled "Method and Apparatus for Providing Information From a Speed and Direction Sensor" and U.S. Pat. No. 8,624,588 entitled "Apparatus and Method for Providing an Output Signal Indicative of a Speed of Rotation and a Direction of Rotation as a Ferromagnetic Object", both of which are incorporated herein by reference in their entireties.

The magnetic field sensor 10 may take the form of an integrated circuit in which one or more substrates support the magnetic field sensing elements 16 and its circuitry. More particularly, the magnetic field sensing elements 16 can be said to be integrated within or upon an integrated circuit substrate. Additional elements of the sensor 10 may include a memory 48 for use by the processor 50 and an electrostatic discharge (ESD) protection device 46 to avoid damage to the circuit in case of an electrostatic discharge.

Figure 3:
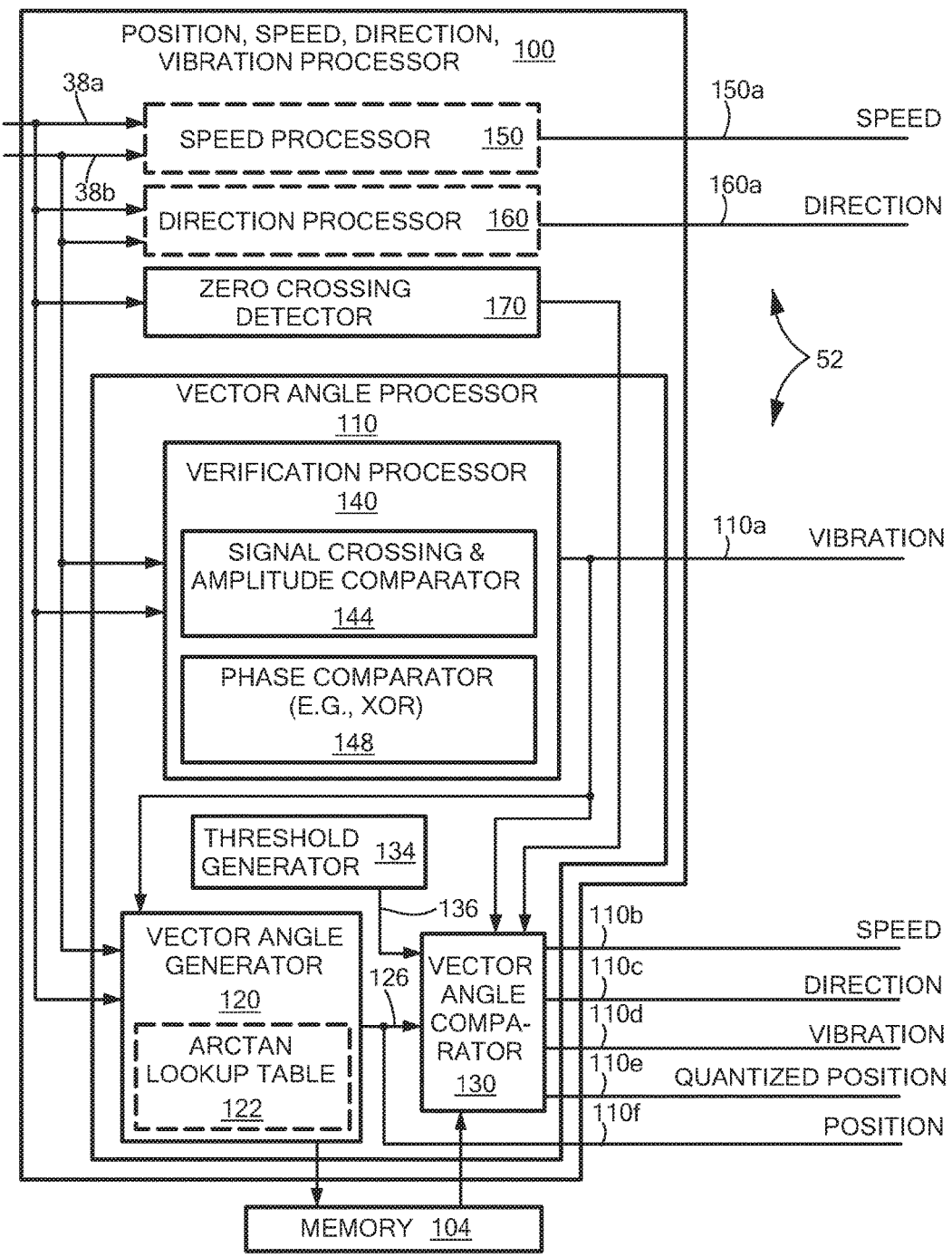
FIG. 3 is a block diagram of the position, speed, direction, and vibration processor of FIG. 1.

Referring also to FIG. 3, an illustrative processor 100 (that may be the same as or similar to the processor 50 of FIG. 1) is responsive to the left and right channel signals 38a, 38b and includes a vector angle processor 110 configured to generate one or more output signals 110a-110f (that may be the same as or similar to the output signals 52 of FIG. 1) indicative of one or more of: a speed of motion of the object 10, a position of the object, a direction of rotation of the object, and a vibration on the object. In the illustrative embodiment, output signals 110a and 110d are indicative of a vibration of the object, output signal 110b is indicative of a speed of motion of the object, output signal 110c is indicative of a direction of motion of the object, and output signals 110e and 110f are indicative of a position of the object, as will be described. The processor 100 is described as providing all of the output signals 110a-110f; however, it will be appreciated that in some embodiments less than all of the output signals or any subcombination thereof may be provided by the sensor.

Processor 100 may include a speed processor 150 and/or a direction processor 160. Speed processor 150 and direction processor 160 are shown with dotted lines as optional since, in some embodiments, speed and/or direction information may be provided by a vector angle processor 110 instead of by the processors 150, 160. In other embodiments however, speed and direction information can be provided both by processors 150, 160 and by the vector angle processor 110.

Speed processor 150 is configured to provide a speed output signal 150a to the output protocol processor 58 (FIG. 1) and may take various conventional forms. In general, the speed processor 150 may take the form of a threshold detector or a peak detector described above and provides an output signal 150a having a state transition rate indicative of a speed of rotation of the object. That is, the output signal 150a, when the gear is rotating, has an edge rate, or frequency indicative of a speed of rotation of the gear.

Direction processor 160 is configured to provide a direction signal 160a to the output protocol processor 58. The relationship between the phases of left and right channel signals 38a, 38b is a function of a direction of rotation of the object 12 (i.e., which signal leads and which signal lags at any given time) and the direction processor 160 is configured to generate an output signal 160a that can be representative of the direction of rotation. As an example, the speed processor 150 and the direction processor 160 may be implemented with circuitry and techniques described in a U.S. Pat. No. 7,365,530 entitled "Method and Apparatus for Vibration Detection" which is assigned to the assignee of the subject application and incorporated herein by reference in its entirety.

The vector angle processor 110 includes a vector angle generator 120 configured to generate vector angle values 126 as a function of the left and right channel signals 38a, 38b. An output of the vector angle generator (i.e., vector angle values 126) may be provided in the form of a position signal 110f. A vector angle comparator 130 is responsive to the vector angle values 126 to generate one or more comparator output signals indicative of a difference between a plurality of vector angle values, as may be used to provide a direction output signal 110c and/or a vibration output signal 110d. Vector angle comparator 130 is further responsive to one or more threshold values 136 provided by a threshold generator 134 to generate one or more comparator output signals indicative of a comparison of a vector angle value to at least one threshold value, as may be used to provide a speed output signal 110b and/or a quantized position output signal 110e.

Figure 4:
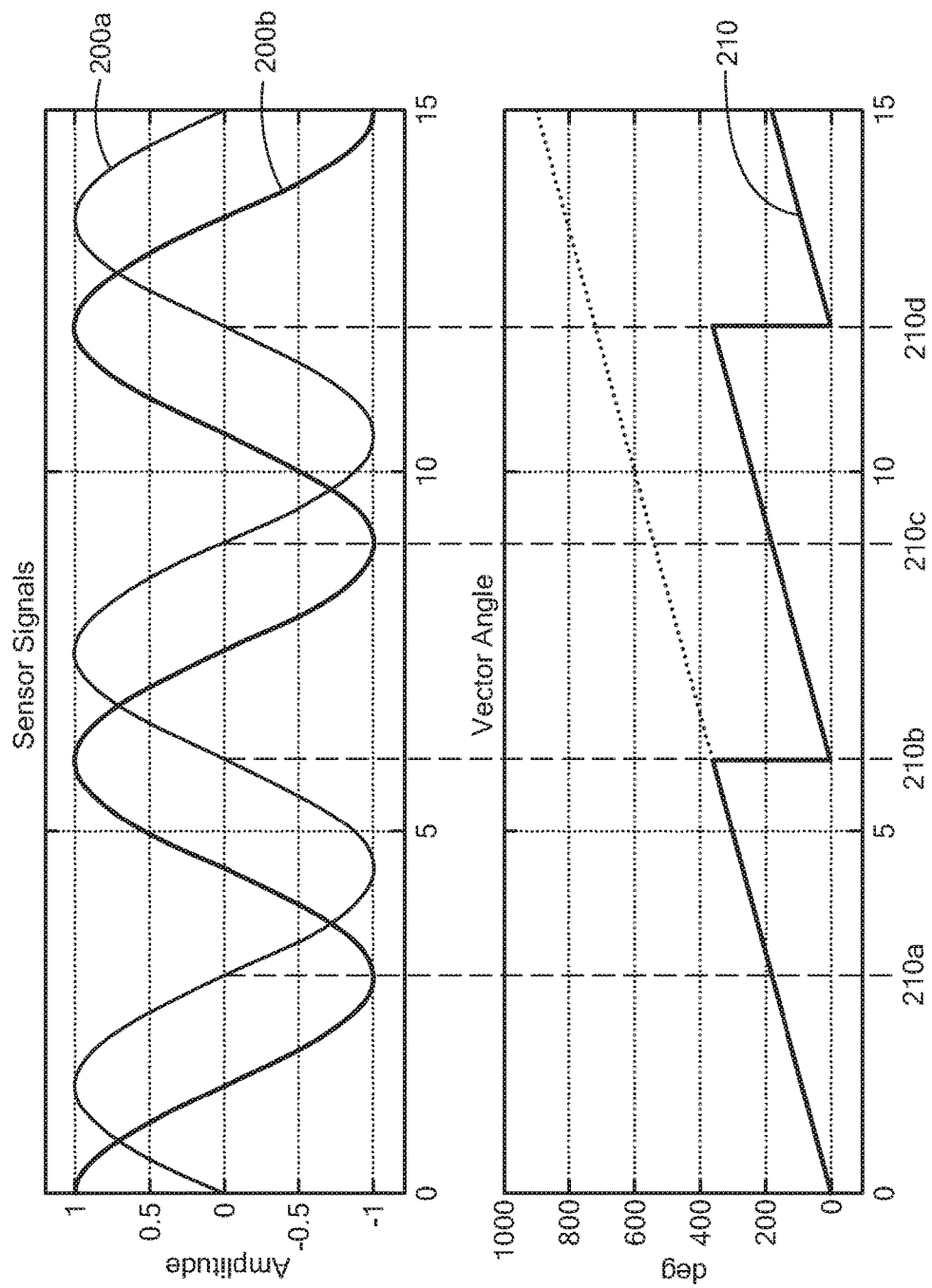
FIG. 4 shows illustrative waveforms associated with the sensor of FIG. 1 including phase-separated magnetic field signals during normal rotation of an ideal object and a corresponding vector angle waveform.
Figure 5:
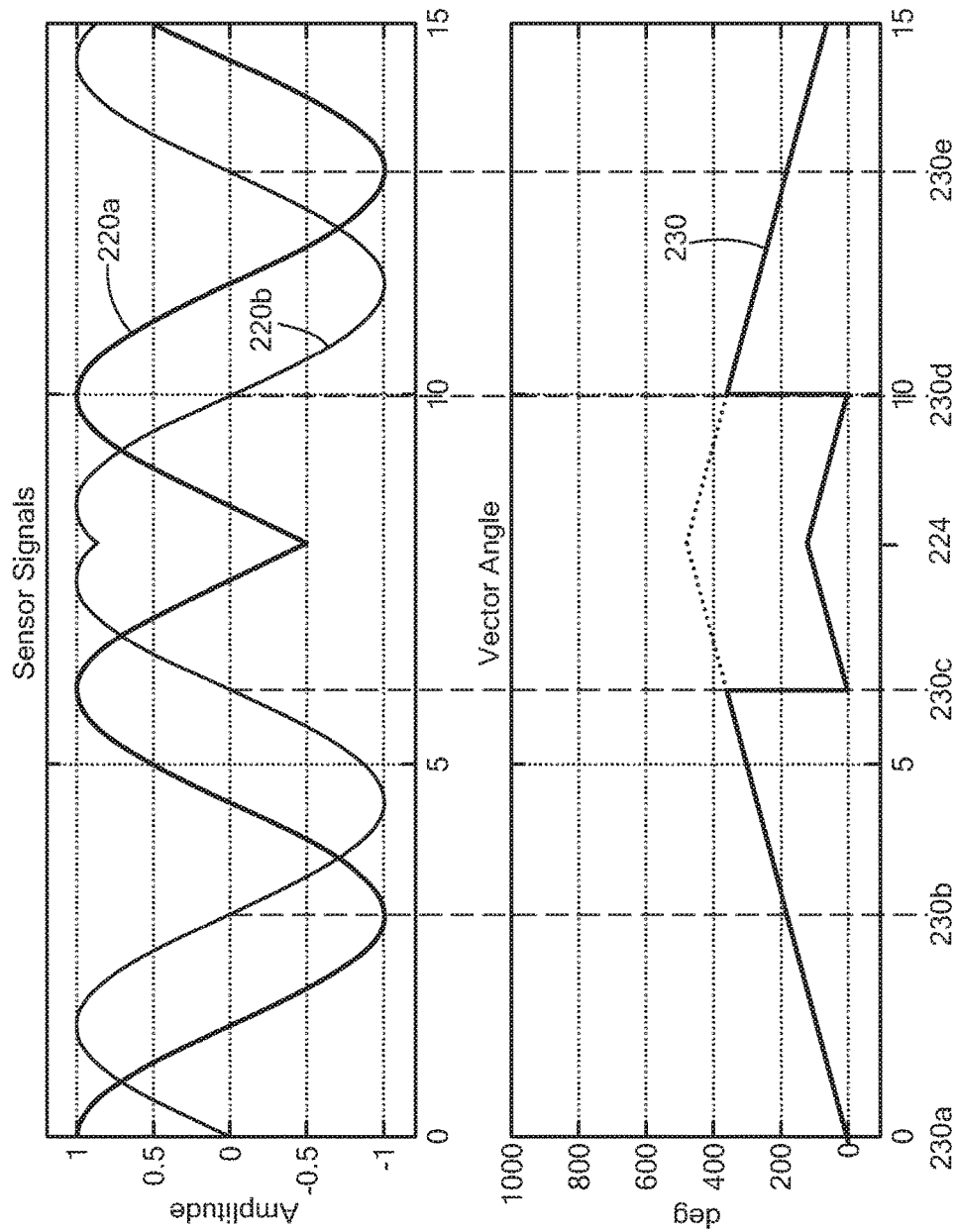
FIG. 5 shows illustrative waveforms associated with the sensor of FIG. 1 including phase-separated magnetic field signals illustrating a rotation direction change of an ideal object and a corresponding vector angle waveform.
Figure 6:
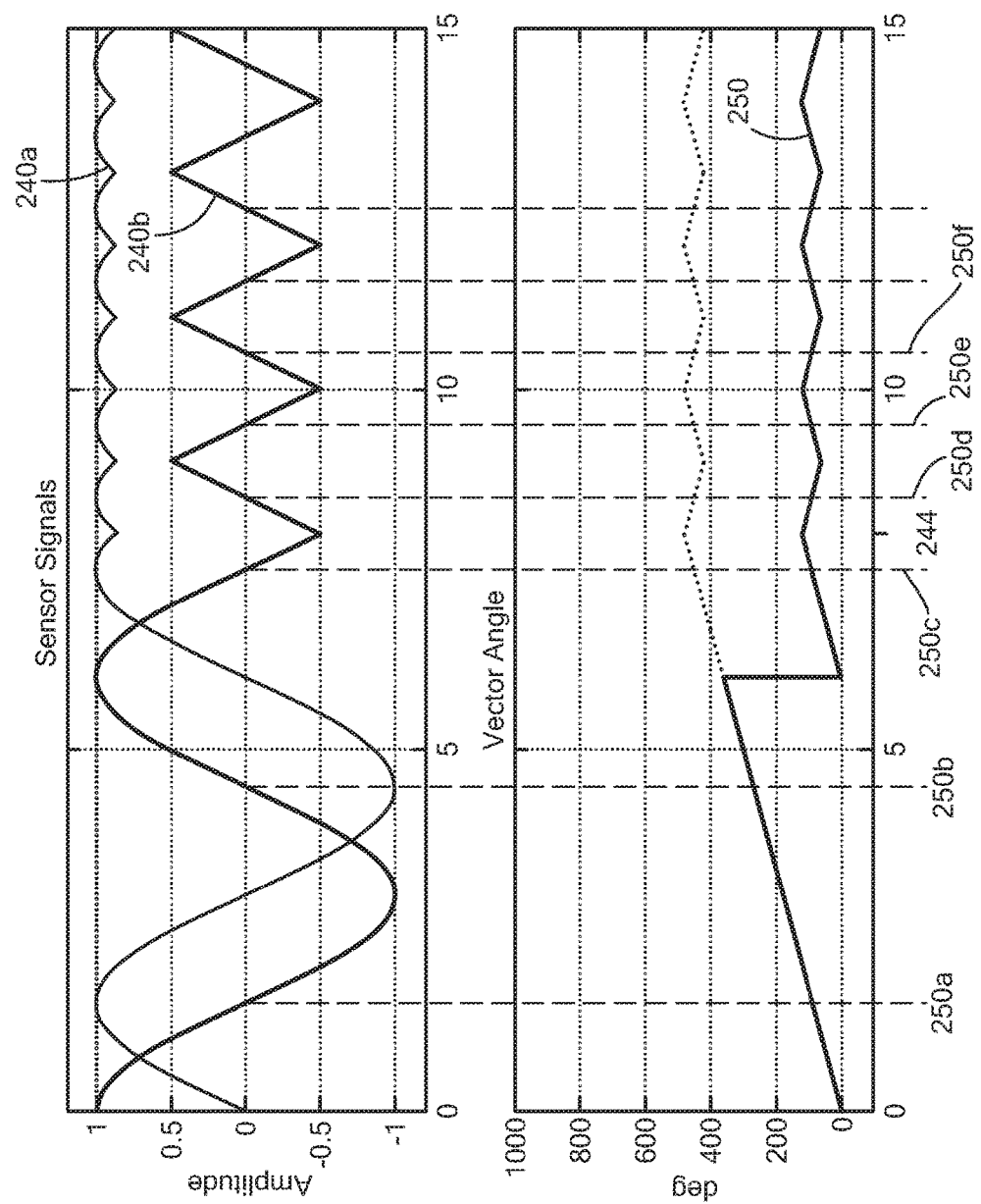
FIG. 6 shows illustrative waveforms associated with the sensor of FIG. 1 including phase-separated magnetic field signals illustrating vibration of an ideal object and a corresponding vector angle waveform.

The principle of operation of the vector angle processor 110 will be described in connection with illustrative waveforms of FIGS. 4-9. Each of FIGS. 4-6 shows illustrative left and right channel signals as may result from detection of a magnetic field associated with an "ideal" object 10 (i.e., one that does not suffer from mechanical tolerances and imperfections, including also variations based on installation, such as air gap variations). These "ideal" waveforms are shown to facilitate explanation of the concepts. Each of FIGS. 7-9 however shows illustrative left and right channel signals as may result from detection of a magnetic field associated with an actual target object, such as a ferromagnetic gear.

Referring to FIG. 4, left and right channel signals 200a, 200b (as may be the same as or similar to signals 38a, 38b of FIG. 1) have respective phases offset by approximately 90°. The horizontal axis on which signals 200a, 200b are shown depicts arbitrary units of time and the vertical axis depicts magnetic field signal strength before normalization. Also shown in FIG. 4 is a vector angle signal 210 The horizontal axis on which the vector angle signal 210 is shown depicts the same arbitrary units of time as the horizontal axis on which the signals 200a, 200b are shown and the vertical axis on which the vector angle signal 210 is shown depicts phase angle of the vector signal in degrees.

The vector angle values 126 provided by the generator 120 correspond to samples of the vector angle signal 210. Various techniques are possible for generating the vector angle values. In one embodiment, the vector angle generator 120 includes a processor to compute an arctangent approximation function, such as a CORDIC approximation, of the left and right channel signals 200a, 200b. Since the approximation may have only a +/−90° output range, sign extension may be performed, such as by detecting the polarity of the ratio of the signals 200a, 200b, to extend the arctangent approximation to 360°.

Alternatively, an arctangent lookup table 122 may be provided to store arctangent values and the vector angle generator 120 may use the instantaneous value of the left and right channels signals 200a, 200b to access the corresponding arctangent value in the table 122 in order to provide the vector angle values.

It will be appreciated by those of ordinary skill in the art that regardless of the particular methodology used to generate the vector angle values 126, the vector angle signal 210 can be considered to correspond to the left and right channel signals 200a, 200b being represented as the real and imaginary parts of a complex vector resulting from plotting instantaneous values of the left and right channels signals 200a, 200b. The resulting vector rotates through 360° as the gear 12 rotates from one tooth to the next. Accordingly, the progression of vector angle values from a time 0 to a time of approximately 6 on the vector angle waveform 210 (i.e., one full cycle of the vector angle signal) represents rotation of the gear from one tooth to an adjacent tooth.

Having determined a vector angle value, the generator 120 may store the value in a memory 104, that may be the same as or similar to memory 48 of FIG. 1.

The memory 48 may take the form of a register and contain only a single, current vector angle value, generated at a predetermined time and stored for later processing as will be described in connection with FIG. 10.

The detection of a difference between a plurality of vector angle values coincident with predetermined points on one of the channel signals 38a, 38b by the vector angle comparator 130 can be used to detect a lack of normal rotation of the object, a direction change, and/or a vibration (and thus, to provide direction and vibration output signals 110c, 110d, respectively). The difference between a first vector angle value and a second later occurring vector angle value can reveal a phase progression of the vector angle signal 210 (and therefore angular position of the gear) consistent with normal rotation (or lack thereof). For example, comparison of the vector angle values at times 210a and 210c (FIG. 4) reveals a phase progression of approximately 360° as indicates a progression of the gear from one tooth to the next (i.e., indicates a normal rotation condition). Similarly, comparison of vector angle values at times 210b and 210d likewise reveals a phase progression of approximately 360°.

The predetermined times of occurrence of the vector angle values being compared (here, times 210a, 210b, 210c, and 210d) coincide with predetermined points on at least one of the left and right channel signals (here, zero crossings of the left channel signal 200a), referred to herein as the trigger signal. As one example, the processor 100 may include a zero crossing detector 170 that is responsive to at least one of the left and right channel signals to generate a signal (e.g., a clock signal) for coupling to the comparator 130. In this way, the predetermined points on the trigger signal correspond to occurrence of a predetermined event of the trigger signal; namely the zero crossings.

It will be appreciated that the expected phase progression of the vector angle signal is a function of the predetermined points on the left or right channel signal with which the vector angle values coincide (i.e., referred to herein as trigger points of the trigger signal). For example, where rising and falling edges of the trigger signal 200a are used, the expected phase progression between compared values is on the order of 180°; whereas if only edges of one polarity of the trigger signal 200a are used, then the expected phase progression is on the order of 360°.

Other predetermined points on the trigger signal or other triggering events may alternatively be used to determine which vector angle values to compare. For example, the predetermined points may coincide with the trigger signal crossing a predetermined threshold level or both the left and right channel signals crossing each other.

Referring also to FIG. 5, phase-separated left and right channel signals 220a, 220b illustrate a rotation direction change of an ideal object and a corresponding vector angle waveform 230. The change in direction of rotation of the object 12 occurs at a time 224 as is apparent from the channel signals 220a, 220b reversing their direction. Comparison of the vector angle values corresponding to predetermined points on a trigger signal, such as at the zero crossings of signal 220a occurring at times 230a, 230b, 230c, and 230d, does not reveal a phase progression sufficient to indicate normal rotation of the gear. Stated differently, detection of a difference between the plurality of vector angle values by the vector angle comparator of less than a predetermined amount reveals a lack of normal rotation, which lack of normal rotation may or may not correspond to a direction change of the gear rotation or perhaps also a vibration. In particular, a comparison of the vector angle values at times 230b and 230c reveals a phase progression of +180°, as is consistent with a normal, positive rotation. A comparison of the vector angle values at times 230c and 230d reveals a difference near zero and thus, at least an absence or lack of normal rotation. At that point, it is unclear whether the lack of normal rotation corresponds to no rotation, a direction change, or a vibration. However, a comparison of the vector angle values at times 230d and 230e reveals a phase progression of −180°, as is clearly indicative of a negative rotation and thus, a direction change.

In embodiments in which the predetermined points of the trigger signal that establish the vector angle values being compared are the zero crossings of the trigger signal, the predetermined amount by which the compared vector angle values differ to indicate normal rotation (i.e., the expected phase progression) may be a multiple of approximately 180°. In order to account for tolerances, the predetermined amount may be some permissible percentage above or below a multiple of 180°. It will also be appreciated that the predetermined amount by which the compared vector angle values differ to indicate normal rotation (i.e., the expected phase progression) can be varied.

It will be appreciated that vibration and direction change are closely related conditions, as a vibration can be characterized as a series of direction changes; or conversely, a direction change can be characterized as a momentary or short duration vibration. Additional processing can be performed to distinguish a direction change from a vibration.

As one example, subsequent comparisons of vector angle values occurring at the predetermined points on the trigger signal can be used to differentiate a direction change from a vibration. More particularly, having determined that the vector angle signal is not progressing in a manner consistent with normal rotation, a subsequent determination can be made as to whether the next detected phase progression consistent with normal rotation is in the same direction. For example, comparison of the vector angle values at times 230d and 230e reveals a negative phase progression (whereas the prior phase progression, as occurred between points 230b and 230c for example, was a positive phase progression).

Referring also to FIG. 6, phase-separated left and right channel signals 240a, 240b illustrate a vibration of an ideal object and a corresponding vector angle waveform 250. Beginning at a time 244, the object 12 begins to vibrate. Comparison of the vector angle values corresponding to predetermined points on trigger signal 220b, such as at the zero crossings of signal 240b occurring at times 250a, 250b, 250c, 250d, 250e, and 250f, does not reveal a phase progression consistent with normal rotation of the gear. Stated differently, detection of a difference between the plurality of vector angle values by the vector angle comparator of less than a predetermined amount reveals an absence of normal rotation.

Various schemes are possible to further characterize the lack of normal rotation as a vibration depending on system requirements. As one example, it may be required that a predetermined number of vector angle comparisons indicate a less than sufficient phase progression in order to result in an indication of a vibration. In other words, it may be required that two or more consecutive comparisons indicate a difference of less than a predetermined amount.

The "rules" or "definitions" or "characteristics" as to what the vector angle comparator 130 must detect in order to indicate a lack of normal rotation, a direction change (signal 110c) and/or a vibration condition (signal 110d) can be predetermined (such as by settings established during manufacture) or alternatively, can be changed, such as by programming certain parameters into the sensor for storage in memory 48 during manufacture or thereafter by a user. For example, the predetermined amount by which compared vector angle values must vary to conclude a lack of normal rotation can be varied. As another example, the number of consecutive comparisons between vector angle values necessary to indicate a vibration may be varied.

Figure 7:
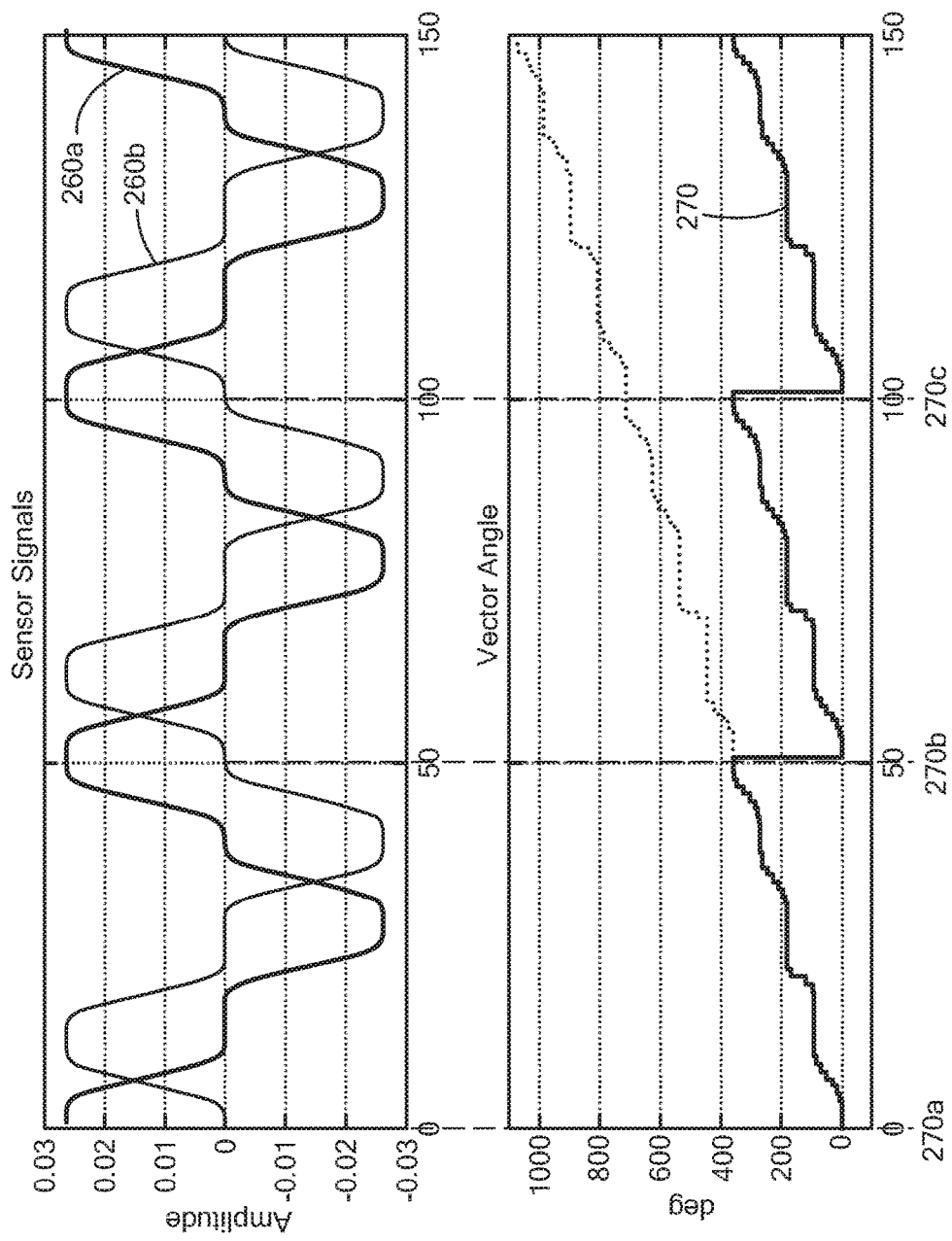
FIG. 7 shows illustrative waveforms associated with the sensor of FIG. 1 including phase-separated magnetic field signals illustrating normal rotation of a real object and a corresponding vector angle waveform.

Referring also to FIG. 7, left and right channel signals 260a, 260b are shown of the type as may be associated with detection of a magnetic field dependent on a real target. It will be appreciated that the signals 260a, 260b are generally sinusoidal, with some distortion and have a nominal phase difference of 90° with some error. As a result, the vector angle waveform 270 based on the signals 260a, 260b has some distortion. However, as is apparent from consideration of the vector angle values at trigger points 270a, 270b for example, the difference between compared vector angle values still represents the expected phase progression as a multiple of 180° (and here a difference on the order of 360° since only zero crossings of one polarity of the trigger signal 260a are used).

Figure 8:
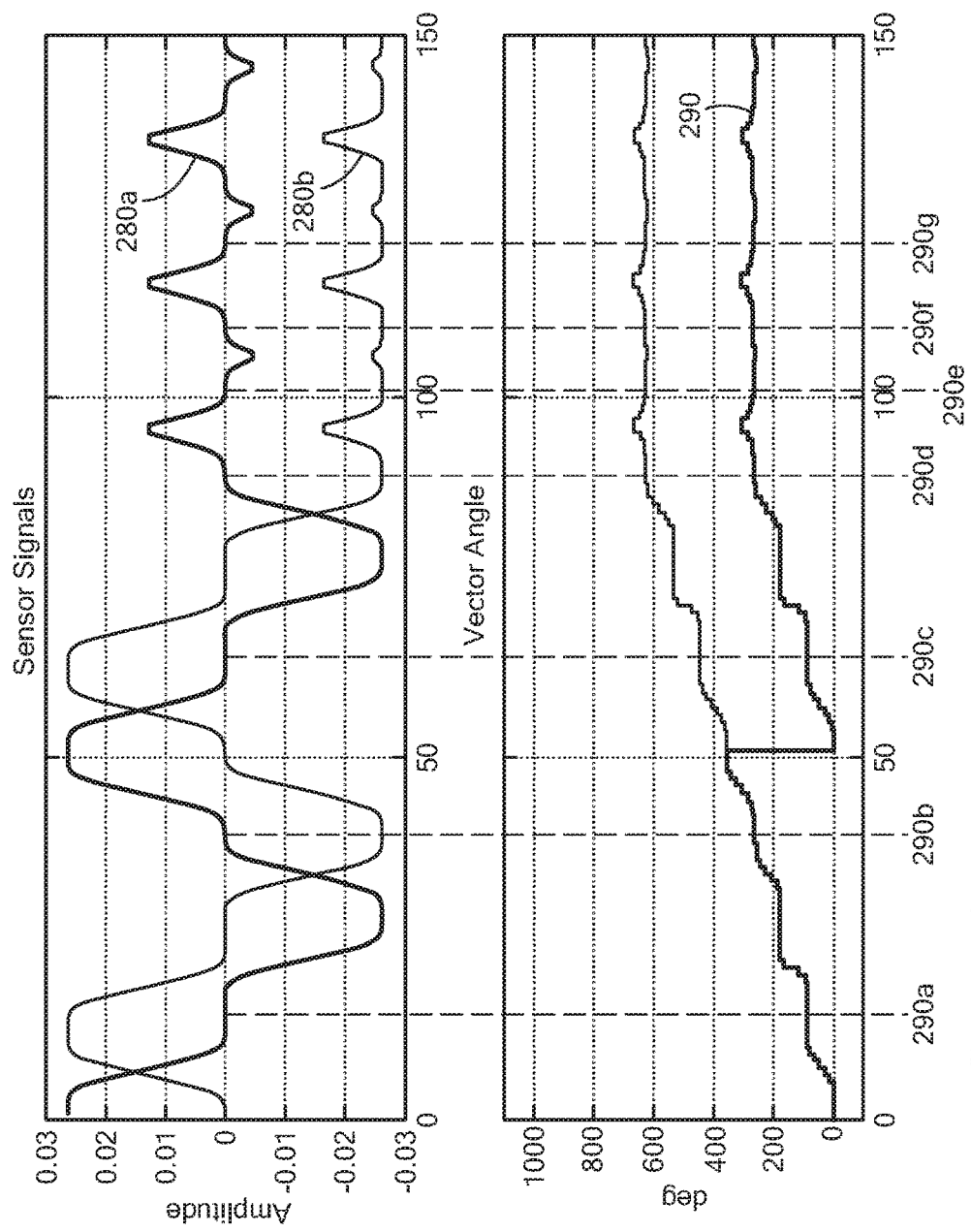
FIG. 8 shows illustrative waveforms associated with the sensor of FIG. 1 including phase-separated magnetic field signals illustrating vibration of an ideal object and a corresponding vector angle waveform.

FIG. 8 shows left and right channel signals 280a, 280b from sensing a real target experiencing a vibration beginning at a time 264 and the resulting vector angle waveform 290. As is apparent from consideration of the vector angle values at trigger points 290a-290h for example, the difference between compared vector angle values is still the expected 180° multiple during normal rotation and then becomes less than this predetermined amount starting at time 290e coinciding with the occurrence vibration. Thus, the described vibration detection is not affected by distortions in the left and right channel signals.

Figure 9:
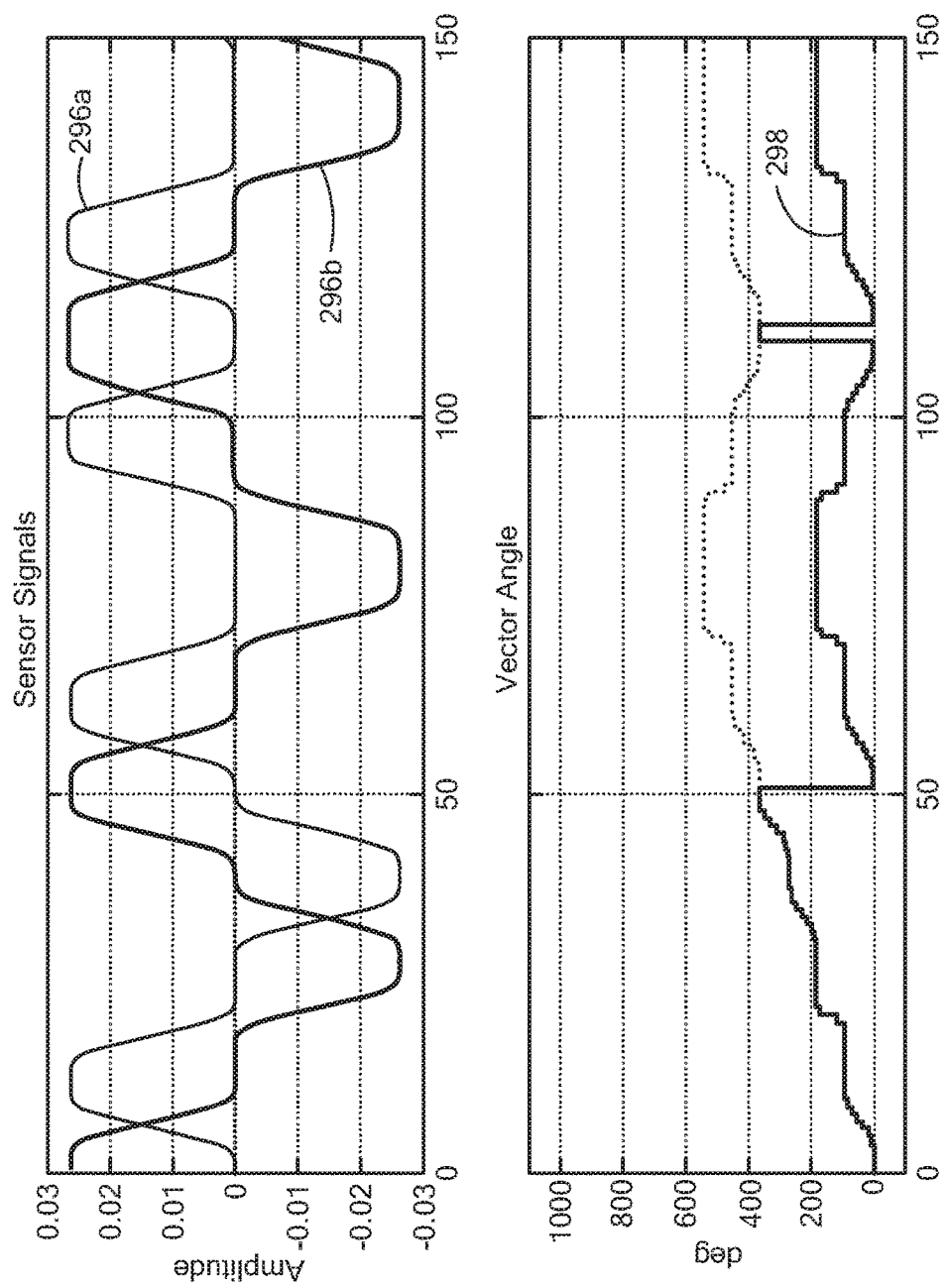
FIG. 9 shows illustrative waveforms associated with the sensor of FIG. 1 including phase-separated magnetic field signals illustrating significant amplitude vibration of an ideal object and a corresponding vector angle waveform.

Furthermore, even a vibration of a significant amplitude, as is shown by the illustrative left and right channel signal waveforms 296a, 296b and in the resulting vector angle waveform 298 of FIG. 9, still exhibits the same detectable behavior of the difference between consecutive vector angle values coinciding with predetermined points on one of the signals 296a, 296b being less than the predetermined amount and therefore being indicative of a vibration.

Comparison of vector angle values 126 to one or more threshold values 136 by the vector angle comparator 130 can be used to detect a speed of motion of the object and/or a position of the object (and thus, to provide speed and quantized position output signals 110b, 110e, respectively). Threshold generator 134 generates one or more threshold values 136 to which the vector angle comparator 130 compares the vector angle values 126. In some embodiments, the threshold value 136 can be a single threshold value and the frequency of crossings of the vector angle value 126 with the threshold is used to provide the speed signal 110b.

As noted above, progression of the vector angle signal through 360° is equivalent to rotation of the object from one tooth to the next. Thus, the vector angle value (i.e., the phase) can be considered equivalent to the position of the object. By dividing the 360° range of the vector angle signal into a plurality of ranges, such as with the use of a plurality of threshold values 136, the vector angle comparator 130 can provide an indication of the gear position (i.e., an indication of which of the plurality of thresholds has been crossed), which position is referred to herein as the quantized position 110e. As one example, dividing the 360° range into eight threshold ranges permits gear position to be resolved to within 45°. It will be appreciated that greater resolutions for the quantized positioned signal 110e can be achieved by increasing the number of threshold values 136 used.

It will also be appreciated that the processing performed by the vector angle comparator to resolve the vector angle value into a particular range (i.e., to determine which of the plurality of threshold has been crossed) can be performed by a different component/controller. For example, in some embodiments, the vector angle value 126 may be provided as an output signal of the sensor (e.g., signal 110f) to an external processor or controller, such as an engine control unit.

The vector angle processor 110 may further include a verification processor 140 that is responsive to the left and right channel signals 38a, 38b and configured to determine if the signals are usable to generate accurate output signals 110b-110f. The verification processor 140 may provide a verification output signal 110a that is merely an indication of the suitability of the left and right channel signals 38a, 38b to permit the vector angle comparator 130 to provide accurate output signals 110b-110f. Alternatively, the verification processor output signal 110a may be itself a signal indicating a vibration.

Verification processor 140 can determine the suitability of the left and right channel signals by determining whether the phase difference between the signals deviates by more than a predetermined amount from the expected, predetermined phase difference, such as 90°. The verification processor 140 includes a signal crossing and amplitude comparator 144, as will be described below in connection with FIG. 10A.

Verification processor 140 may additionally or alternatively include a phase comparator 148. Phase comparator 148 may take the form of an XOR logic function performed on low pass filtered left and right channel signals since, if the output of the XOR is defined to either 0 or 1, the low pass filtered signals at 90° phase shift provides an output of 0.5. More generally, input signals with a phase shift within a range of 0° to 180° yields an output proportional to the phase difference and scaled between 0 and 1. Alternatively, phase comparator 148 may operate to determine whether the expected phase difference between the left and right channel signals exists by integrating the product of the two signals over one period (defined by the trigger points), such as by using actual values of both the left and right channel signals or by using values of one such waveform along with a representation of the other signal in the form of a sine or cosine signal.

It will be appreciated that various techniques for verifying the suitability of the left and right channel signals to provide an accurate indication of speed/position, direction, and/or vibration are possible, as alternatives to, or in addition to those techniques described here.

Figure 10:
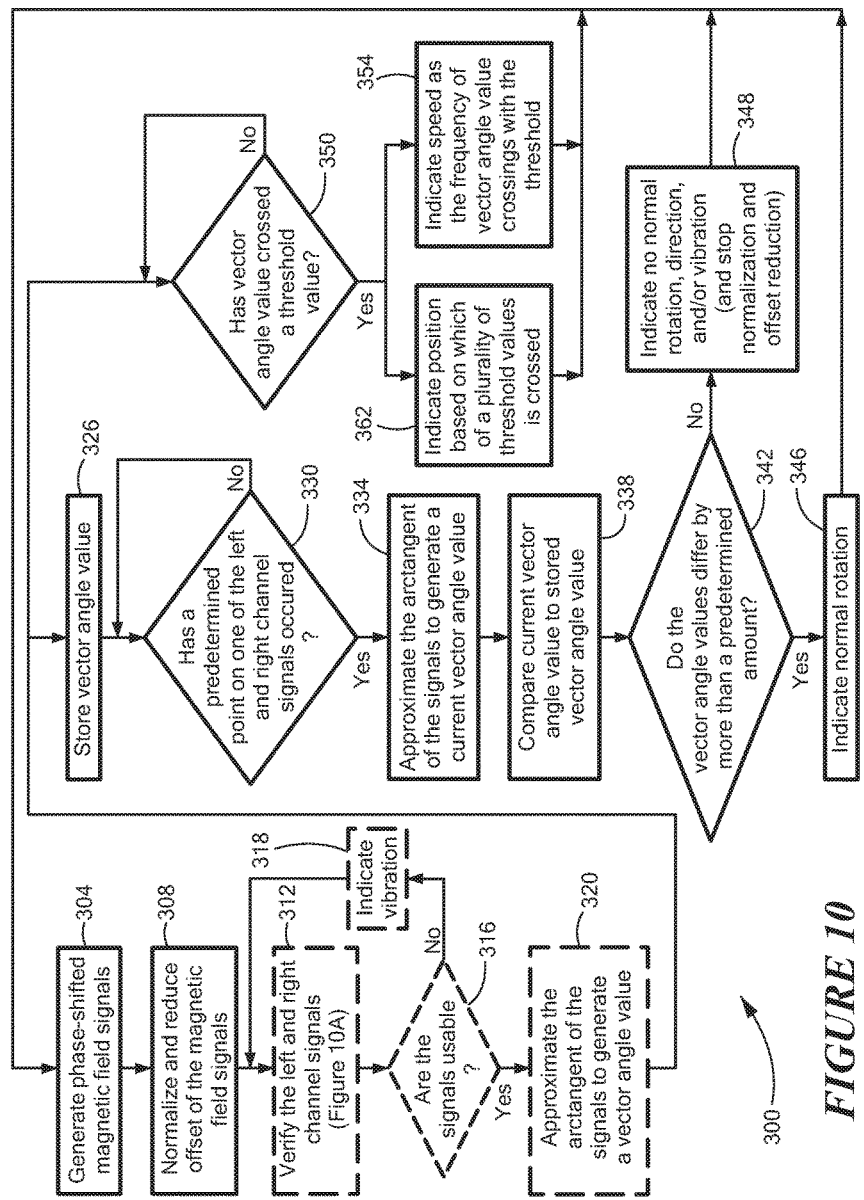
FIG. 10 is a flow diagram illustrating a method implemented by the processor of FIG. 3.
Figure 10A:
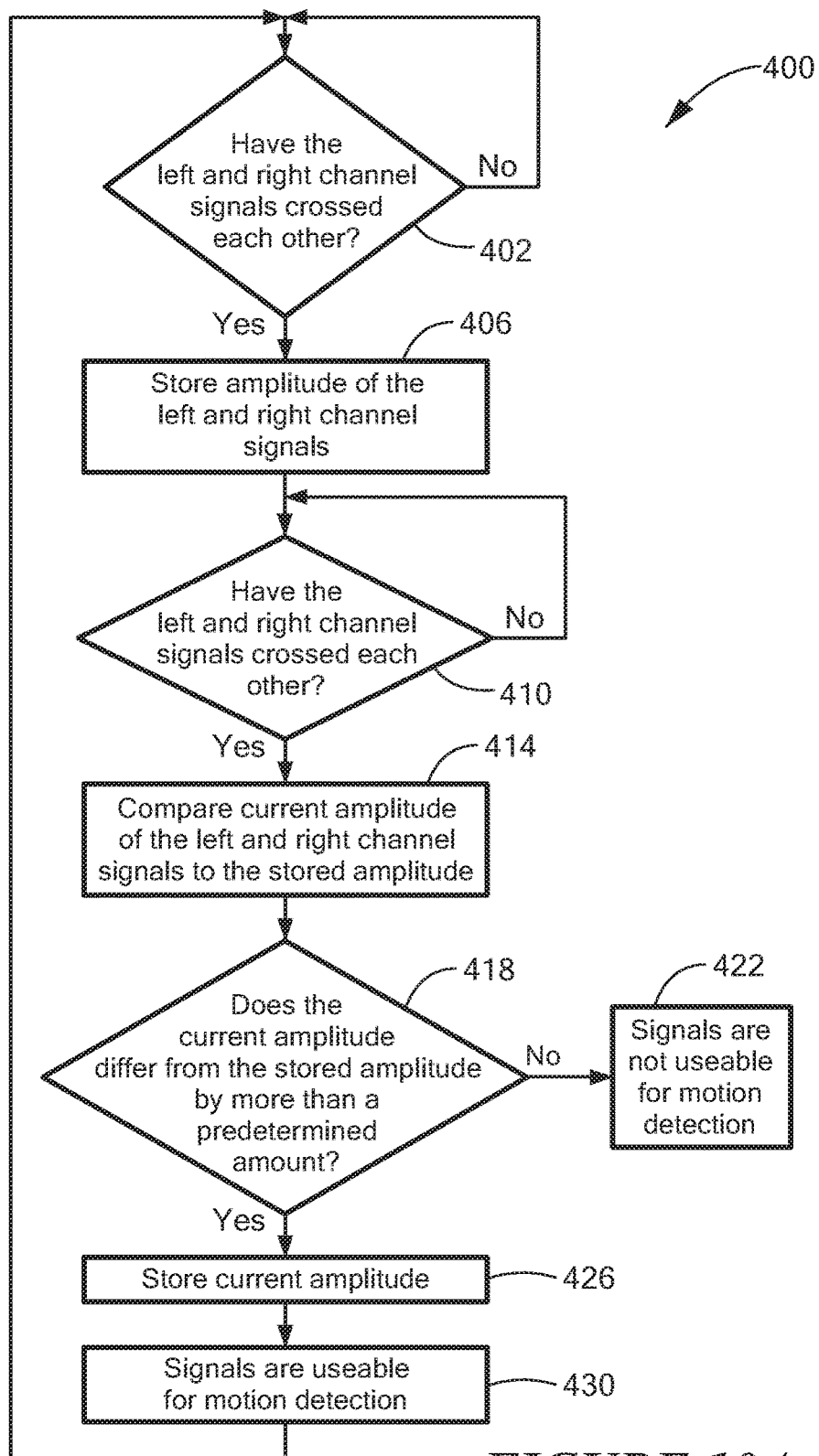
FIG. 10A is a flow diagram illustrating a method implemented by the processor of FIG. 3 to verify the magnetic field signals.

FIGS. 10 and 10A show flowcharts corresponding to processes implemented by the processor 100 of FIG. 3. Rectangular elements, herein denoted "processing blocks," represent computer software instructions or groups of instructions. Diamond shaped elements, herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated file blocks described below are unordered meaning that, when possible, the steps can be performed in any convenient or desirable order.

Referring to FIG. 10, an illustrative process 300 as may be performed by the vector angle processor (such as processor 110 of FIG. 3) and other portions of the magnetic field sensor 10 of FIG. 1, commences in block 304 by generating phase-separated magnetic field signals, like signals 24a, 24b of FIG. 1.

In block 308, the left and right channel signals are normalized and their offset is reduced (e.g., by modules 36a, 36b of FIG. 1), so as to provide left and right channel signals, like signals 38a, 38b. In block 312, the left and right channel signals 38a, 38b are verified. More particularly, it is determined in block 316 whether the signals are usable to provide accurate sensor output signals (e.g., by verification processor 140 of FIG. 3). If it is determined that the left and right channel signals are not useable to detect characteristics of object motion, then in block 318, a signal (like signal 110a of FIG. 3) may be generated to indicate the occurrence of a vibration. Depending on the techniques used to verify the signals and the system requirements, alternatively, the indication provided at block 318 may be merely an indication that the signals are not useable.

If it is determined in block 316 that the left and right channel signals are useable for object motion detection, then in block 320, the arctangent of the signals is approximated to generate a vector angle value (e.g., by vector angle generator 120 of FIG. 3) that is stored in memory (e.g., memory 48 of FIG. 1) at block 326 as a "stored" vector angle value. As explained above, the arctangent can be approximated in various ways, such as by computing the arctangent with an approximation formula, such as CORDIC, or alternatively, by using an arctangent lookup table.

In one embodiment, the left and right channel signals 38a, 38b the peak-to-peak signal amplitude is divided into ranges, each range representing a predetermined percentage, such as one-eighth, of the peak-to-peak signal range. With this particular arrangement, an arctangent lookup table containing sixty-four values can be used to provide the vector angle value corresponding to the instantaneous left and right channel signals 38a, 38b. It will be appreciated that a different number of ranges into which the peak-to-peak signal amplitude is divided can be used in order to vary the resolution of the signal amplitude and/or the resolution of the vector angle value, respectively. The resolution can also be varied by varying the number of bits comprising the left and right channel signals 38a, 38b.

At block 330, it is determined whether a predetermined point on one of the magnetic field signals has occurred (which, as explained above, may coincide with a predetermined event such as a zero crossing). In one embodiment, the predetermined point coincides with each zero crossing of the right channel signal 38a. Upon this occurrence, a new vector angle value is approximated at block 334 and at block 338, the new (i.e., "current") vector angle value is compared to the vector angle value stored at block 326. For example, a stored vector angle value coinciding with time 250b in FIG. 6 may be compared to a current vector angle value at coinciding with time 250c.

At block 342, it is determined whether the compared vector angle values differ by more than a predetermined amount. As noted above, as one example, a vector angle difference that is a multiple of 180° is indicative of normal rotation. Stated differently, it is determined whether or not the phase progression of the vector angle signal that has occurred between the time when the stored vector angle value was approximated and the time when the current vector angle value was approximated is consistent with normal rotation of the gear 12. Note that the sign of the phase progression is also taken into account since a phase progression of +180° can indicate a normal, forward rotation and a phase progression of −180° can indicate a normal, reverse rotation.

If the difference between the stored vector angle value and the current vector angle value is not greater than the predetermined amount, then at block 348, one or more of the following conditions are indicated: a lack of normal rotation of the gear, a direction change of the gear, and/or a vibration condition. As noted above, the rules defining which of these conditions is indicated can be selected based on the particular system requirements and can be predetermined or preselected or alternatively, can be user programmable.

Additionally various other actions may be taken in response to a determination that the phase of the vector angle signal is not progressing in a manner consistent with normal rotation. For example, the amplitude normalization and offset reduction by the modules 36a, 36b (FIG. 1) may be terminated. This is because if the amplitude normalization and offset reduction modules 36a, 36b were act on the vibrating left and right channel signals, then the vibration condition could be masked by continued normalization. Thus, the vibration signals 110d (FIG. 3) may be coupled to the amplitude normalization and offset reduction modules 36a, 36b for this purpose (signal line 56 of FIG. 1). Additionally or alternatively, the speed signal 150a and/or 110b may be suppressed in response to detection of a vibration.

If the vector angle comparison at block 342 is consistent with normal rotation, then an indication of normal rotation is provided at block 346 and the process repeats at block 304.

Also following determination of the vector angle value in block 320, it is determined in block 350 whether the vector angle value has crossed a threshold value (i.e., threshold value 136 of FIG. 3). As noted above, in some embodiments, the phase angle range representing rotation from one gear tooth to the next (i.e., 360° phase range) may be divided into a plurality of ranges with corresponding thresholds and the plurality of thresholds 136 may be provided to the vector angle comparator 130. In such embodiments in which a plurality of threshold values is used, an indication of the position of the gear can be provided in the form of a quantized position signal 110e in block 362, following which the process repeats at block 304.

The frequency of crossings of vector angle values 126 with the plurality of threshold values can be used to provide the speed signal 110b (FIG. 3) in block 354, following which the process repeats at block 304. It will be appreciated that the resolution for the speed signal 110b can be greater than the resolution of a speed signal provided by a conventional speed processor (like speed signal 150a from speed processor 150 in FIG. 3) since the speed pulses coincide with the crossings of the vector angle values with the plurality of threshold values.

It will be appreciated that steps illustrated in FIG. 10 may occur simultaneously rather than sequentially. Additionally, it will be appreciated that not every processing step performed by the magnetic field sensor 10 (FIG. 1) is illustrated in the flowchart.

Referring to FIG. 10A, an illustrative process performed by the signal crossing and amplitude comparator 144 of the verification processor 140 (FIG. 3) commences with a determination at block 402 of whether or not the left and right channel signals (e.g, signals 38a, 38b) have crossed each other (i.e., have the same value). Once the signals cross each other, their amplitude is stored at block 406, such as in memory 104 (FIG. 3).

At block 410, it is determined whether or not the left and right channel signals have crossed each other again. Once this subsequent signal crossing occurs, the signal amplitude at the current signal crossing is compared to the stored signal amplitude at block 414 and it is determined at block 418 whether or not the current amplitude differs from the stored amplitude by more than a predetermined amount.

If it is determined at block 418 that the current and stored amplitudes do not differ by more than predetermined amount, then the signals are considered not useable for motion detection and an indication thereof is provided at block 422. As noted above, depending on system requirements, this indication may be an indication of the occurrence of a vibration or an indication of the signals not being useable to provide a valid output signal. At block 426, the current signal amplitude is stored and an indication is provided at block 430 that the signals are useable for motion detection, following which the process repeats at block 402.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

All references cited herein are hereby incorporated herein by reference in their entirety.

Having described preferred embodiments, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A magnetic field sensor for detecting motion of an object, comprising:
   a plurality of magnetic field sensing elements configured to generate at least two magnetic field signals each having an amplitude dependent on a magnetic field associated with the object and a respective phase;
   a processor configured to process the magnetic field signals, comprising:
     a vector angle generator to generate a plurality of vector angle values indicative of angular position of the object, the vector angle values being generated as a function of the magnetic field signals; and
     a vector angle comparator responsive to the vector angle values to generate a comparator output signal indicative of a difference between the plurality of vector angle values; and
   an output signal generator coupled to the vector angle comparator and configured to generate a sensor output signal in response to the comparator output signal, wherein the sensor output signal is indicative of one or more conditions comprising: an absence of normal rotation of the object, a direction change of the motion of the object, and a vibration of the object.

2. The magnetic field sensor of claim 1 wherein sensor output signal indicates the condition when the comparator output signal indicates a difference between the plurality of vector angle values of less than a predetermined amount.

3. The magnetic field sensor of claim 2 wherein the predetermined amount is a multiple of approximately 180°.

4. The magnetic field sensor of claim 1 wherein the vector angle comparator is further responsive to at least one of the magnetic field signals and wherein the plurality of compared vector angle values correspond to predetermined points on the at least one magnetic field signal.

5. The magnetic field sensor of claim 4 wherein the predetermined points on the at least one magnetic field signal correspond to at least one of: zero crossings of the at least one magnetic field signal, crossings of the at least one magnetic field signal with a threshold signal, or crossings of the magnetic field signals with each other.

6. The magnetic field sensor of claim 1 wherein the vector angle values generated by the vector angle generator comprise an approximation of the arctangent of the two magnetic field signals.

7. The magnetic field sensor of claim 6 wherein the vector angle generator comprises an arctangent lookup table.

8. The magnetic field sensor of claim 1 wherein the phases of the magnetic field signals are separated by approximately 90°.

9. The magnetic field sensor of claim 1 further comprising a verification processor responsive to the magnetic field signals and configured to determine if the magnetic field signals are useable to generate the sensor output signal.

10. The magnetic field sensor of claim 1 further comprising a normalization module coupled between the magnetic field sensing elements and the processor and operable to normalize the amplitudes of the magnetic field signals.

11. The magnetic field sensor of claim 1 further comprising an offset reduction module coupled between the magnetic field sensing elements and the processor and operable to reduce an offset of at least one of the magnetic field signals.

12. The magnetic field sensor of claim 1 wherein each of the magnetic field signals comprises a difference between output signals of the plurality of magnetic field sensing elements.

13. The magnetic field sensor of claim 1 wherein the magnetic field sensor comprises at least three magnetic field sensing elements, each providing a respective output signal, and further comprises a combining circuit coupled to the at least three magnetic field sensing elements and configured to generate the magnetic field signals as a difference between the output signals of at least two of the magnetic field sensing elements, a sum of the output signals of at least two magnetic field sensing elements, or both.

14. The magnetic field sensor of claim 1 wherein the object is comprised of a magnetic material and wherein magnetic field is generated by the object.

15. The magnetic field sensor of claim 1 wherein the object is comprised of a ferromagnetic material and wherein the magnetic field is affected by movement of the object.

16. The magnetic field sensor of claim 15 further comprising a magnet and wherein the magnetic field is generated by the magnet.

17. The magnetic field sensor of claim 1 wherein the magnetic field sensing elements are Hall effect elements.

18. The magnetic field sensor of claim 1 wherein the magnetic field sensing elements are magnetoresistance elements.

19. The magnetic field sensor of claim 18 wherein each of the magnetoresistance elements is one of: an anisotropic magnetoresistance (AMR) element, a giant magnetoresistance (GMR) element; a tunneling magnetoresistance (TMR) element; a magnetic tunnel junction (MTJ) element; or a spin valve element.

20. A method for detecting motion of an object, comprising:
   generating at least two magnetic field signals, each having an amplitude dependent on a magnetic field associated with the object and a respective phase;
   generating a plurality of vector angle values as a function of the magnetic field signals, the vector angle values indicative of angular position of the object;
   comparing a plurality of the vector angle values to generate a comparator output signal indicative of a difference between the plurality of vector angle values; and
   generating, in response to the comparator output signal, an output signal indicative of a condition of the object motion comprising one or more of an absence of normal rotation of the object, a direction change of the motion of the object, and a vibration of the object.

21. The method of claim 20 wherein generating the output signal comprises generating the output signal to indicate the presence of the condition when the comparator output signal indicates a difference between the plurality of vector angle values of less than a predetermined amount.

22. The method of claim 21 wherein the predetermined amount is a multiple of approximately 180°.

23. The method of claim 20 wherein compared vector angle values correspond to predetermined points on at least one of the magnetic field signals and wherein the predetermined points comprise at least one of: zero crossings of the at least one magnetic field signal, crossings of the at least one magnetic field signal with a threshold signal, or crossings of the magnetic field signals with each other.

24. The method of claim 20 wherein generating the vector angle values comprises accessing an arctangent lookup table as a function of a ratio of the amplitudes of the magnetic field signals.

25. The method of claim 20 wherein generating the magnetic field signals comprises providing the magnetic field signals with a nominal difference between their respective phases of approximately 90°.

26. The method of claim 20 further comprising verifying whether the magnetic field signals are useable to generate the output signal.

27. The method of claim 20 further comprising normalizing the amplitude of the magnetic field signals.

28. The method of claim 20 further comprising reducing an offset of at least one of the magnetic field signals.

29. The method of claim 20 wherein generating the magnetic field signals comprises providing the magnetic field signals as a difference between output signals of at least two magnetic field sensing elements, a sum of output signals of at least two magnetic field sensing elements, or both.

30. A magnetic field sensor for detecting motion of an object, comprising:
   a plurality of magnetic field sensing elements configured to generate at least two magnetic field signals each having an amplitude proportional to a magnetic field associated with the object and a respective phase;
   a processor configured to process the magnetic field signals, comprising:
      vector angle generator to generate a plurality of vector angle values indicative of angular position of the object, the vector angle values being generated as a function of the magnetic field signals; and
      a vector angle comparator responsive to the vector angle value and a threshold value to generate a comparator output signal indicative of a comparison of the vector angle value to the threshold value; and
   an output signal generator coupled to the vector angle comparator and configured to generate a sensor output signal in response to the comparator output signal, wherein the sensor output signal is indicative of a speed of motion of the object.

31. The magnetic field sensor of claim 30 wherein the vector angle comparator is responsive to a plurality of threshold values to generate a comparator output signal indicative of a comparison of the vector angle value to the plurality of threshold values and wherein the output signal generator is configured to generate the sensor output signal based the comparison of the vector angle value to the plurality of threshold values, wherein the sensor output signal is further indicative of a position of the object.

* * * * *

UNITED STATES PATENT AND TRADEMARK OFFICE
CERTIFICATE OF CORRECTION

PATENT NO. : 9,739,637 B2
APPLICATION NO. : 14/529480
DATED : August 22, 2017
INVENTOR(S) : Christian Feucht et al.

It is certified that error appears in the above-identified patent and that said Letters Patent is hereby corrected as shown below:

Column 3, Line 5 and Column 4, Line 43, delete "including vector" and replace with --including a vector--

Column 4, Line 15, delete "coincident" and replace with --coincide--

Column 4, Line 56, delete "based a" and replace with --based on a--

Column 5, Line 48, delete "a real" and replace with --of an ideal--

Column 6, Line 49, delete ", crank shaft," and replace with --, crankshaft,--

Column 7, Line 10, delete "be an analog" and replace with --be analog--

Column 8, Lines 25 and 44, delete both instances of "may the" and replace with --may be the--

Column 8, Lines 61-62, delete "in a co-pending" and replace with --in co-pending--

Column 9, Line 21, delete "82a-82," and replace with --82a-82c,--

Column 9, Line 31 and Column 11, Lines 46-47 delete both instances of "in a U.S." and replace with --in U.S.--

Column 10, Line 39, delete "sec)" and replace with --μsec)--

Column 12, Line 19, delete "210 The" and replace with --210. The--

Column 12, Line 24, delete "depicts phase" and replace with --depicts a phase--

Column 12, Lines 39 and 48, delete "channels" and replace with --channel--

Signed and Sealed this
Third Day of July, 2018

Andrei Iancu
*Director of the United States Patent and Trademark Office*

CERTIFICATE OF CORRECTION (continued)
U.S. Pat. No. 9,739,637 B2

Column 14, Line 35, delete "at a time 244," and replace with --at time 244,--

Column 15, Line 15, delete "at a time 264" and replace with --at time 264--

Column 15, Line 62, delete "threshold" and replace with --thresholds--

Column 17, Line 33-34, delete "the left and right channel signals 38a, 38b"

Column 17, Lines 56-57, delete "value at coinciding" and replace with --value coinciding--

Column 18, Line 24, delete "were act" and replace with --were to act--

Column 19, Line 12, delete "than predetermined" and replace with --than a predetermined--

Column 19, Line 62, delete "wherein sensor" and replace with --wherein the sensor--

Column 20, Lines 49-50, delete "wherein magnetic" and replace with --wherein a magnetic--

Column 22, Line 18, delete "vector" and replace with --a vector--

Column 22, Line 37, delete "based the" and replace with --based on the--